(12) United States Patent
Yu et al.

(10) Patent No.: US 9,838,685 B2
(45) Date of Patent: *Dec. 5, 2017

(54) METHOD AND APPARATUS FOR EFFICIENT SLICE HEADER PROCESSING

(71) Applicant: Google Technology Holdings LLC, Mountain View, CA (US)

(72) Inventors: Yue Yu, San Diego, CA (US); Jian Lou, Cupertino, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1053 days.

This patent is subject to a terminal disclaimer.

(21) Appl. No.: 13/863,094

(22) Filed: Apr. 15, 2013

(65) Prior Publication Data

US 2013/0336399 A1 Dec. 19, 2013

Related U.S. Application Data

(63) Continuation of application No. 13/863,072, filed on Apr. 15, 2013, now abandoned.

(Continued)

(51) Int. Cl.
*H04N 19/00* (2014.01)
*H04N 19/46* (2014.01)
(Continued)

(52) U.S. Cl.
CPC ..... *H04N 19/00545* (2013.01); *H04N 19/174* (2014.11); *H04N 19/46* (2014.11);
(Continued)

(58) Field of Classification Search
CPC ........... H04N 19/00545; H04N 19/174; H04N 19/46; H04N 19/521; H04N 19/61; H04N 19/70

See application file for complete search history.

(56) References Cited

U.S. PATENT DOCUMENTS

| | | | |
|---|---|---|---|
| 2012/0195368 A1* | 8/2012 | Chien | H04N 19/52 375/240.02 |
| 2012/0287999 A1* | 11/2012 | Li | H04N 19/52 375/240.16 |

(Continued)

OTHER PUBLICATIONS

ISO/IEC, "ISO/IEC 14496-10", Oct. 1, 2004, 2nd Edition, pp. 1-280.*

(Continued)

*Primary Examiner* — Peter D Le
(74) *Attorney, Agent, or Firm* — Young Basile Hanlon & MacFarlane, P.C.

(57) ABSTRACT

A method, apparatus, article of manufacture, and a memory structure for encoding or decoding a sequence comprising a plurality of pictures, each of the plurality of pictures partitionable into one or more slices, each of the one or more slices processed at least in part according to a slice header. In one embodiment, all the relative syntax and function calls under the condition of slice type equal to P or B are grouped together, and syntax describing the initial value for a quantization parameter to be used in coding blocks of data and deblocking related syntax are put before this group of syntax and function calls.

8 Claims, 24 Drawing Sheets

Related U.S. Application Data

(60) Provisional application No. 61/659,986, filed on Jun. 15, 2012.

(51) Int. Cl.
*H04N 19/70* (2014.01)
*H04N 19/61* (2014.01)
*H04N 19/174* (2014.01)
*H04N 19/513* (2014.01)

(52) U.S. Cl.
CPC .......... *H04N 19/521* (2014.11); *H04N 19/61* (2014.11); *H04N 19/70* (2014.11)

(56) References Cited

U.S. PATENT DOCUMENTS

| | | | |
|---|---|---|---|
| 2012/0300846 A1* | 11/2012 | Sugio | H04N 19/105 375/240.16 |
| 2013/0177082 A1* | 7/2013 | Sugio | H04N 19/51 375/240.16 |
| 2013/0336384 A1 | 12/2013 | Yu et al. | |

OTHER PUBLICATIONS

Benjamin Bross; Woo-Jin Han; Jens-Rainer Ohm; Gary J. Sullivan; Thomas Wiegand: "High efficiency video coding (HEVC) text specification draft 7", Jun. 12, 2012, pp. 1-258. Retrieved from the Internet: URL:http://phenix.it-sudparis.eu/jct/doc_end user/documents/9 Geneva/wg11/JCTVC-I1003-v5.zip -[retrieved on Jul. 3, 2013], all pages.
Patent Cooperation Treaty, International Search Report and Written Opinion of the International Searching Authority for International Application No. PCT/US2013,041764, Aug. 2, 2013, 11 pages.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Mozilla, "Introduction to Video Coding Part 1: Transform Coding", Video Compression Overview, Mar. 2012, 171 pp.
Overview; VP7 Data Format and Decoder. Version 1.5. On2 Technologies, Inc. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.

\* cited by examiner

| IDX | R PIX |
|---|---|
| 0 | 4 |
| 1 | 2 |
| 2 | 0 |
| 3 | 6 |
| 4 | 8 |
| 5 | 10 |

P = LIST 0

| IDX | R PIX |
|---|---|
| 0 | 6 |
| 1 | 8 |
| 2 | 10 |
| 3 | 4 |
| 4 | 2 |
| 5 | 0 |

P, B = LIST 1

| slice_header() { | DESCRIPTOR |
|---|---|
| 1602 { first slice_in_pic_flag | u(l) |
| 1604 { pic_parameter_set_id | ue(v) |
| 1606 { if( !first_slice_in_pic_flag ) | |
|     slice_address | u(v) |
| 1608 { if( dependent_slice_enabled_flag && !first &_slice_in_pic_flag ) | |
|     dependent_slice flag | u(l) |
| 1610 { if( !dependent_slice_flag ) { | |
|     slice_type | ue(v) |
| if( output_flag_present_flag ) | |
|     pic_output_flag | u(l) |
| if( separate_colour_plane_flag == 1 ) | |
|     colour_plane_id | u(2) |
| if( RapPicFlag ) { | |
|     rap_pic_id | ue(v) |
|     no_output_of_prior_pics_flag | u(l) |
| } | |
| if( !IdrPicFlag ) { | |
|     pic_order_cnt_lsb | u(v) |
|     short_term_ref_pic_set_sps_flat | u(l) |
|     if( !short_term_ref_pic_set_sps_flag ) | |
|         short_term_ref_pic_set( num_short_term_ref_pic_sets ) | |
|     Else | |
|         short_term_ref_pic_set_idx | u(v) |
|     if( long_term_ref_pics_present_flag ) { | |
| 1612 {     num_long_term_pics | ue(v) |
|     for( i=0; i< num_long_term_pics; i++) { | |
|         poc_lsb_lt[ i ] | u(v) |
|         delta_poc_msb_present_flag[ i ] | u(l) |
|         if( delta_poc_msb_present_flag[ i ]) | |
|             delta_poc_msb_cycle_lt[ i ] | ue(v) |
|         used_by_curr_pic_lt_flag[ i ] | u(l) |
|     } | |
| } | |
| } | |
| if( sample_adaptive_offset_enabled_flag ) { | |
|     slice_sample_adaptive_offset_flag[ 0 ] | u(l) |
|     if( slice_sample_adaptive_offset_flag [ 0 ]{ | |
|         slice_sample_adaptive_offset_flag[ 1 ] | u(l) |
|         slice_sample_adaptive_offset_flag[ 2 ] | u(l) |
|     } | |
| } | |

*FIG. 16A*

| | | |
|---|---|---|
| 1614 { | if( adaptive_loop_filter_enabled_flag ) | |
| | aps_id | ue(v) |
| 1615 { | if( slice_type == P \|\| slice_type== B ) { | |
| 1616 { | if( sps_temporal_mvp_enable_flag ) | |
| | pic_temporal_mvp_enable_flag | u(l) |
| 1617 — | num_ref_idx_active_override_flag | u(l) |
| 1618 { | if( num_ref_idx_active_override_flag ) { | |
| | num_ref_idx_l0_active_minus1 | ue(v) |
| | if( slice_type == B ) | |
| | num_ref_idx_l1_active_minus1 | ue(v) |
| | } | |
| | } | |
| 1619 { | if( lists_modification_present_flag ) | |
| | ref_pic_list_modification( ) | |
| 1620 { | if( slice_type == B ) | |
| | mvd_l1_zero_flag | u(l) |
| 1622 { | if( cabac_init_present_flag && slice_type != I ) | |
| | cabac_init_flag | u(l) |
| 1624 { | slice_qp_delta | se(v) |
| | if( deblocking_filter_control_present_flag ) { | |
| | if ( deblocking_filter_override_enabled_flag ) | |
| | deblocking_filter_override_flag | u(l) |
| | if( deblocking_filter_override_flag ) { | |
| 1626 { | slice_header_disable_deblocking_filter_flag | u(l) |
| | if( !slice_header_disable_deblocking_filter_flag ) { | |
| | beta_offset_div2 | se(v) |
| | tc_offset_div2 | se(v) |
| | } | |
| | } | |
| | } | |
| 1628 { | if( pic_temporal_mvp_enable_flag ) { | |
| 1630 { | if( slice_type == B ) | |
| 1632 { | collocated_from_l0_flag | u(l) |
| 1634 { | if(slice_type !=I && ((collocated_from_l0_flag && num_ref_idx_l0_active_minus1 > 0 ) \|\| (!collocated_from_l0_flag && num_ref_idx_l1_active_minus1 > 0 ) ) | |
| | collocated_ref_idx | ue(v) |
| | } | |
| 1636 { | if( ( weighted_pred_flag && slice_type == P ) \|\| (weighted_bipred_idc == 1 && slice_type == B ) ) | |
| | pred_weight_table( ) | |
| 1638 { | if( slice_type == P \|\| slice_type == B) | |
| | five_minus_max_num_merge_cand | ue(v) |
| 1640 { | if( adaptive_loop_filter_enabled_flag ) { | |
| | slice_adaptive_loop_filter_flag | u(l) |

*FIG. 16B*

| | | |
|---|---|---|
| 1640 | if( slice_adaptive_loop_filter_flag && alf_coef_in_slice_flag ) | |
| | alf_param( ) | |
| | if( slice_adaptive_loop_filter_flag && alf_coef_in_slice_flag ) | |
| | alf_cu_control_param( ) | |
| | } | |
| 1642 | if( seq_loop_filter_across_slices_enabled_flag && (slice_adaptive_loop_filter_flag \|\| slice_sample_adaptive_offset_flag \|\| !disable_deblocking_filter_flag ) ) | |
| | slice_loop_filter_across_slices_enabled_flag | u(l) |
| | } | |
| 1644 | if( tiles_or_entropy_coding_sync_idc = = 1 \|\| tiles_or_entropy_coding_sync_idc = = 2 ) { | |
| | num_entry_point_offsets | ue(v) |
| | if( num_entry_point_offsets > 0 ) { | |
| | offset_len_minus1 | ue(v) |
| | for( i=0; i< num_entry_point_offsets; i++ ) | |
| | entry_point_offset[ i ] | u(v) |
| | } | |
| | } | |
| | if( slice_header_extension_present_flag ) { | |
| | slice_header_extension_length | ue(v) |
| | for( i=0; i < slide_header_extension_length; i++ ) | |
| | slice_header_extension_data_byte | u(8) |
| | } | |
| | byte_alignment() | |
| | } | |

*FIG. 16C*

| | | |
|---|---|---|
| | aps_id | ue(v) |
| 1701 | if( slice_type == P \|\| slice_type== B ) { | |
| 1702 | if( sps_temporal_mvp_enable_flag ) | |
| | pic_temporal_mvp_enable_flag | |
| 1703 | num_ref_idx_active_override_flag | u(1) |
| | if( num_ref_idx_active_override_flag ) { | u(1) |
| 1704 | num_ref_idx_l0_active_minus1 | |
| | if( slice_type == B ) | ue(v) |
| | num_ref_idx_l1_active_minus1 | |
| | } | ue(v) |
| 1705 | if( lists_modification_present_flag ) | |
| | ref_pic_list_modification( ) | |
| 1706 | if( slice_type == B ) | |
| | mvd_l1_zero_flag | u(1) |
| 1708 | if( cabac_init_present_flag && slice_type != I ) | |
| | cabac_init_flag | u(1) |
| | if( pic_temporal_mvp_enable_flag ) { | |
| | if( slice_type == B ) | |
| 1710 | collocated_from_l0_flag | u(1) |
| | if((collocated_from_l0_flag && num_ref_idx_l0_active_minus1 > 0 ) \|\| (!collocated_from_l0_flag && num_ref_idx_l1_active_minus1 > 0 ) ) | |
| | collocated_ref_idx | ue(v) |
| | } | |
| 1712 | if( ( weighted_pred_flag && slice_type == P ) \|\| (weighted_bipred_idc == 1 && slice_type == B ) ) | |
| | pred_weight_table( ) | |
| 1714 | five_minus_max_num_merge_cand | ue(v) |
| | } | |
| 1716 | slice_qp_delta | se(v) |
| | if( deblocking_filter_control_present_flag ) { | |
| | if ( deblocking_filter_override_enabled_flag ) | |
| | deblocking_filter_override_flag | u(1) |
| | if( deblocking_filter_override_flag ) { | |
| 1718 | slice_header_disable_deblocking_filter_flag | u(1) |
| | if( !slice_header_disable_deblocking_filter_flag ) { | |
| | beta_offset_div2 | se(v) |
| | tc_offset_div2 | se(v) |
| | } | |
| | } | |

*FIG. 17A*

| | | |
|---|---|---|
| 1720 | if( adaptive_loop_filter_enabled_flag ) { | |
| |    slice_adaptive_loop_filter_flag | u(l) |
| |    if( slice_adaptive_loop_filter_flag && alf_coef_in_slice_flag ) | |
| |       alf_param( ) | |
| |    if( slice_adaptive_loop_filter_flag && alf_coef_in_slice_flag ) | |
| |       alf_cu_control_param( ) | |
| | } | |
| 1722 | if( seq_loop_filter_across_slices_enabled_flag && <br>   (slice_adaptive_loop_filter_flag \|\| slice_sample_adaptive_offset_flag \|\| <br>   !disable_deblocking_filter_flag ) ) | |
| |    slice_loop_filter_across_slices_enabled_flag | u(l) |
| | } | |
| 1724 | if( tiles_or_entropy_coding_sync_idc = = 1 \|\| <br>   tiles_or_entropy_coding_sync_idc = = 2 ) { | |
| |    num_entry_point_offsets | ue(v) |
| |    if( num_entry_point_offsets > 0 ) { | |
| |       offset_len_minus1 | ue(v) |
| |       for( i=0; i< num_entry_point_offsets; i++ ) | |
| |          entry_point_offset[ i ] | u(v) |
| |    } | |
| | } | |
| | if( slice_header_extension_present_flag ) { | |
| |    slice_header_extension_length | ue(v) |
| |    for( i=0; i < slide_header_extension_length; i++ ) | |
| |       slice_header_extension_data_byte | u(8) |
| | } | |
| | byte_alignment() | |
| | } | |

*FIG. 17B*

| | | |
|---|---|---|
| | aps_id | |
| 1716 { | slice_qp_delta | se(v) |
| | if( deblocking_filter_control_present_flag ) { | |
| | if ( deblocking_filter_override_enabled_flag ) | |
| | deblocking_filter_override_flag | u(l) |
| | if( deblocking_filter_override_flag ) { | |
| 1718 { | slice_header_disable_deblocking_filter_flag | u(l) |
| | if( !slice_header_disable_deblocking_filter_flag ) { | |
| | beta_offset_div2 | se(v) |
| | tc_offset_div2 | se(v) |
| | } | |
| | } | |
| | } | |
| 1701 { | if( slice_type == P \|\| slice_type== B ) { | |
| 1702 { | if( sps_temporal_mvp_enable_flag ) | |
| | pic_temporal_mvp_enable_flag | |
| 1703 — | num_ref_idx_active_override_flag | u(l) |
| | if( num_ref_idx_active_override_flag ) { | u(l) |
| 1704 { | num_ref_idx_l0_active_minus1 | |
| | if( slice_type == B ) | ue(v) |
| | num_ref_idx_l1_active_minus1 | |
| | } | ue(v) |
| 1705 { | if( lists_modification_present_flag ) | |
| | ref_pic_list_modification( ) | |
| 1706 { | if( slice_type == B ) | |
| | mvd_l1_zero_flag | u(l) |
| 1708 { | if( cabac_init_present_flag && slice_type != I ) | |
| | cabac_init_flag | u(l) |
| | if( pic_temporal_mvp_enable_flag ) { | |
| | if( slice_type == B ) | |
| 1710 { | collocated_from_l0_flag | u(l) |
| | if((collocated_from_l0_flag && num_ref_idx_l0_active_minus1 > 0 ) \|\| | |
| | (!collocated_from_l0_flag && num_ref_idx_l1_active_minus1 > 0 ) ) | |
| | collocated_ref_idx | ue(v) |
| | } | |
| | if( ( weighted_pred_flag && slice_type == P ) \|\| | |
| 1712 { | (weighted_bipred_idc == 1 && slice_type == B ) ) | |
| | pred_weight_table( ) | |
| 1714 { | five_minus_max_num_merge_cand | ue(v) |
| | } | |

*FIG. 19A*

| | | |
|---|---|---|
| 1720 | if( adaptive_loop_filter_enabled_flag ) { | |
| | slice_adaptive_loop_filter_flag | u(l) |
| | if( slice_adaptive_loop_filter_flag && alf_coef_in_slice_flag ) | |
| | alf_param( ) | |
| | if( slice_adaptive_loop_filter_flag && alf_coef_in_slice_flag ) | |
| | alf_cu_control_param( ) | |
| | } | |
| 1722 | if( seq_loop_filter_across_slices_enabled_flag && (slice_adaptive_loop_filter_flag \|\| slice_sample_adaptive_offset_flag \|\| !disable_deblocking_filter_flag ) ) | |
| | slice_loop_filter_across_slices_enabled_flag | u(l) |
| | } | |
| 1724 | if( tiles_or_entropy_coding_sync_idc = = 1 \|\| tiles_or_entropy_coding_sync_idc = = 2 ) { | |
| | num_entry_point_offsets | ue(v) |
| | if( num_entry_point_offsets > 0 ) { | |
| | offset_len_minus1 | ue(v) |
| | for( i=0; i< num_entry_point_offsets; i++ ) | |
| | entry_point_offset[ i ] | u(v) |
| | } | |

*FIG. 19B*

| | | |
|---|---|---|
| 1701 { | if( slice_type == P \|\| slice_type== B ) { | ue(v) |
| 1702 { | if( sps_temporal_mvp_enable_flag ) | |
| | pic_temporal_mvp_enable_flag | |
| 1703 — | num_ref_idx_active_override_flag | u(l) |
| | if( num_ref_idx_active_override_flag ) { | u(l) |
| 1704 { | num_ref_idx_l0_active_minus1 | |
| | if( slice_type == B ) | ue(v) |
| | num_ref_idx_l1_active_minus1 | |
| | } | ue(v) |
| 1705 { | if( lists_modification_present_flag ) | |
| | ref_pic_list_modification( ) | |
| 1706 { | if( slice_type == B ) | |
| | mvd_l1_zero_flag | u(l) |
| 1708 { | if( cabac_init_present_flag && slice_type != I ) | |
| | cabac_init_flag | |
| | } | |
| 1716 { | slice_qp_delta | se(v) |
| | if( deblocking_filter_control_present_flag ) { | |
| | if ( deblocking_filter_override_enabled_flag ) | |
| | deblocking_filter_override_flag | u(l) |
| | if( deblocking_filter_override_flag ) { | |
| | slice_header_disable_deblocking_filter_flag | u(l) |
| 1718 { | if( !slice_header_disable_deblocking_filter_flag ) { | |
| | beta_offset_div2 | se(v) |
| | tc_offset_div2 | se(v) |
| | } | |
| | } | |
| | } | |

*FIG. 20A*

| | | |
|---|---|---|
| 2002 → | if( slice_type ==P \|\| slice_type ==B ) { | |
| 1710 { |   if( pic_temporal_mvp_enable_flag ) { | |
| |     if( slice_type == B ) | u(l) |
| |     collocated_from_l0_flag | |
| |     if((collocated_from_l0_flag && num_ref_idx_l0_active_minus1 > 0 ) \|\| (!collocated_from_l0_flag && num_ref_idx_l1_active_minus1 > 0 ) ) | |
| |     collocated_ref_idx | ue(v) |
| |   } | |
| 1712 { |   if( ( weighted_pred_flag && slice_type == P ) \|\| | |
| |     (weighted_bipred_idc == 1 && slice_type == B ) ) | |
| |     pred_weight_table( ) | |
| 1714 { |   five_minus_max_num_merge_cand | ue(v) |
| | } | |
| 1720 { |   if( adaptive_loop_filter_enabled_flag ) { | |
| |     slice_adaptive_loop_filter_flag | u(l) |
| |     if( slice_adaptive_loop_filter_flag && alf_coef_in_slice_flag ) | |
| |     alf_param( ) | |
| |     if( slice_adaptive_loop_filter_flag && alf_coef_in_slice_flag ) | |
| |     alf_cu_control_param( ) | |
| |   } | |
| 1722 { |   if( seq_loop_filter_across_slices_enabled_flag && (slice_adaptive_loop_filter_flag \|\| slice_sample_adaptive_offset_flag \|\| !disable_deblocking_filter_flag ) ) | |
| |     slice_loop_filter_across_slices_enabled_flag | u(l) |
| | } | |
| 1724 { |   if( tiles_or_entropy_coding_sync_idc = = 1 \|\| tiles_or_entropy_coding_sync_idc = = 2 ) { | |
| |     num_entry_point_offsets | ue(v) |
| |     if( num_entry_point_offsets > 0 ) { | |
| |       offset_len_minus1 | ue(v) |
| |       for( i=0; i< num_entry_point_offsets; i++ ) | |
| |         entry_point_offset[ i ] | u(v) |
| |     } | |
| |   } | |
| |   if( slice_header_extension_present_flag ) { | |
| |     slice_header_extension_length | ue(v) |
| |     for( i=0; i < slide_header_extension_length; i++ ) | |
| |       slice_header_extension_data_byte | u(8) |
| |   } | |
| |   byte_alignment() | |
| | } | |

*FIG. 20B*

METHOD AND APPARATUS FOR EFFICIENT SLICE HEADER PROCESSING

CROSS-REFERENCE TO RELATED APPLICATIONS

This application claims priority to U.S. Provisional Patent Application No. 61/659,986, entitled "MODIFICATION OF SLICE HEADER FOR HEVC," by Yue Yu, Jian Lou, and Limin Wang, filed Jun. 15, 2012, which application is hereby incorporated by reference herein in its entirety. Further, this application is a Continuation of U.S. patent application Ser. No. 13/863,072, entitled "METHOD AND APPARATUS FOR EFFICIENT SLICE HEADER PROCESSING," by Yue Yu, Jian Lou, and Limin Wang, filed Apr. 15, 2013, which application is hereby incorporated by reference herein in its entirety.

BACKGROUND OF THE INVENTION

1. Field of the Invention

The present invention relates to systems and methods for encoding data, and in particular to a system and method for generating and processing slice headers with high efficiency video coded data.

2. Description of the Related Art

There is rapid growth in the technologies associated with the generation, transmission, and reproduction of media programs. These technologies include coding schemes that permit digital versions of the media programs to be encoded to compress them to much smaller size and facilitate their transmission, storage, reception and playback. These technologies have application in personal video recorders (PVRs), video on demand (VOD), multiple channel media program offerings, interactivity, mobile telephony, and media program transmission.

Without compression, digital media programs are typically too large to transmit and/or store for a commercially acceptable cost. However, compression of such programs has made the transmission and storage of such digital media programs not only commercially feasible, but commonplace.

Initially, the transmission of media programs involved low to medium resolution images transmitted over high bandwidth transmission media such as cable television and satellite. However, such transmission has evolved to include lower bandwidth transmission media such as Internet transmission to fixed and mobile devices via computer networks, WiFi, Mobile TV and third and fourth generation (3G and 4G) networks. Further, such transmissions have also evolved to include high definition media programs such as high definition television (HDTV), which have significant transmission bandwidth and storage requirements.

The High Efficiency Video Coding (HEVC) coding standard (or H.265) is the most recent coding standard promulgated by the ISO/IEC MPEG standardization organizations. The coding standard preceding HEVC included the H.262/MPEG-2 and the subsequent H.264/MPEG-4 Advanced Video Coding (AVC) standard. H.264/MPEG-4 has substantially replaced H.262/MPEG-2 in many application including high definition (HD) television. HEVC supports resolutions higher than HD, even in stereo or multi-view embodiments, and is more suitable for mobile devices such as tablet personal computers. Further information regarding HEVC can be found in the publication "Overview of the High Efficiency Video Coding (HEVC) Standard, by Gary J. Sullivan, Jens-Rainer Ohm, Woo Jin Han and Thomas Wiegand, IEEE Transactions on Circuits and Systems for Video Technology, December 2012, which is hereby incorporated by reference herein.

As in other coding standards, the bitstream structure and syntax of HEVC compliant data are standardized, such that every decoder conforming to the standard will produce the same output when provided with the same input. Some of the features incorporated into the HEVC standard include the definition and processing of a slice, one or more of which may together comprise one of the pictures in a video sequence. A video sequence comprises a plurality of pictures, and each picture may comprise one or more slices. Slices include non-dependent slices and dependent slices. A non-dependent slice (hereinafter simply referred to as a slice) is a data structure that can be decoded independently from other slices of the same picture in terms of entropy encoding, signal prediction, and residual signal construction. This data structure permits resynchronization of events in case of data losses. A "dependent slice" is a structure that permits information about the slice (such as those related with tiles within the slice or wavefront entries) to be carried to the network layer, thus making that data available to a system to more quickly process fragmented slices. Dependent slices are mostly useful for low-delay encoding.

The encoding and decoding of slices is performed according to information included in a slice header. The slice header includes syntax and logic for reading flags and data that are used in decoding the slice. Since any given video stream typically includes thousands of pictures, and each picture may contain one or more slices, the syntax and logic used the header can have a significant impact on the processing load performed to encode and later decode the video stream. Accordingly, there is a need for a slice header syntax and logic that minimizes the processing necessary to decode and use the slice header. The present invention satisfies this need.

SUMMARY OF THE INVENTION

To address the requirements described above, this document discloses a method usable in a processing system for decoding a sequence comprising a plurality of pictures, each of the plurality of pictures partitionable into one or more slices, each of the one or more slices processed at least in part according to a slice header. In one embodiment, the method comprises (a) decoding an initial value for coding blocks within the slice; (b) decoding deblocking filter parameters according to the slice header; (c) determining, if a slice of the one or more slices is an inter-predicted slice according to slice type data; (d) if the slice is determined to be an inter-picture predicted slice, performing, with further slice type testing performed only to identify the inter-predicted slice as either a P-type slice or a B-type slice: (1) determining if a sequence temporal motion vector predictor flag indicates that the sequence in which the picture is disposed may be encoded using the at least one temporal motion vector predictor; (2) if the sequence temporal motion vector predictor flag indicates that the sequence in which the picture is disposed is encoded using the at least one temporal motion vector predictor, reading a slice/picture temporal motion vector predictor enable flag indicating that the picture in which the slice is disposed is encoded using at least one temporal motion vector predictor; (3) reading a reference picture override flag indicating whether data describing a maximum index of at least one list of reference pictures having the at least one reference picture is included in the slice header; (4) if the read reference picture override flag indicates that the data describing the maximum index of the at least one list of reference pictures having the at least one reference picture is present, reading the data; (5) reading reference picture list modification information only if the at least one reference picture is not implicitly defined; (6) reading information indicating a structure of motion vector differences used in the motion compensation prediction if the slice is a B-slice; (7) reading information defining initialization of context variables for entropy coding of the slice only if the information defining initialization of the context variables is present in the slice header; (8) determining if the slice is encoded using at least one temporal motion predictor according to the read picture temporal motion vector predictor enable flag; (9) only if the slice encoded using at least one temporal motion predictor, reading information describing at least one reference picture of the slice associated with the at least one temporal motion predictor at least in part according to whether the slice is a P-type slice or a B-type slice; (10) applying a weighted prediction according to whether the slice is a B-type slice or a P-type slice; and (11) determining, from the slice header, a maximum number of merged temporal motion vector predictor candidates for the slice.

In another embodiment the method comprises steps for encoding the sequence described above, and includes the steps of encoding slice type data for a slice of the one or more slices in the header, the slice type data indicating the slice type; encoding slice header logic for decoding an initial value for coding blocks within the slice; encoding slice header logic for decoding deblocking filter parameters according to the slice header; encoding slice header logic for determining, if a slice of the one or more slices is an inter-predicted slice according to slice type data read from the slice header; encoding slice header logic for performing, with further slice type testing performed only to identify the inter-predicted slice as either a P-type slice or a B-type slice, steps comprising steps (1)-(11) above if the slice determined to be an inter-picture predicted slice.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Referring now to the drawings in which like reference numbers represent corresponding parts throughout:

FIGS. 16A-16C are diagrams presenting a baseline slice header logic and syntax;

FIGS. 17A and 17B present syntax diagrams illustrating one embodiment of an improved slice header syntax;

FIGS. 19A and 19B present syntax diagrams illustrating another embodiment of an improved slice header syntax;

FIGS. 20A and 20B present syntax diagrams illustrating another embodiment of an improved slice header syntax.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Audio-Visual Information Transception and Storage

Figure 1:
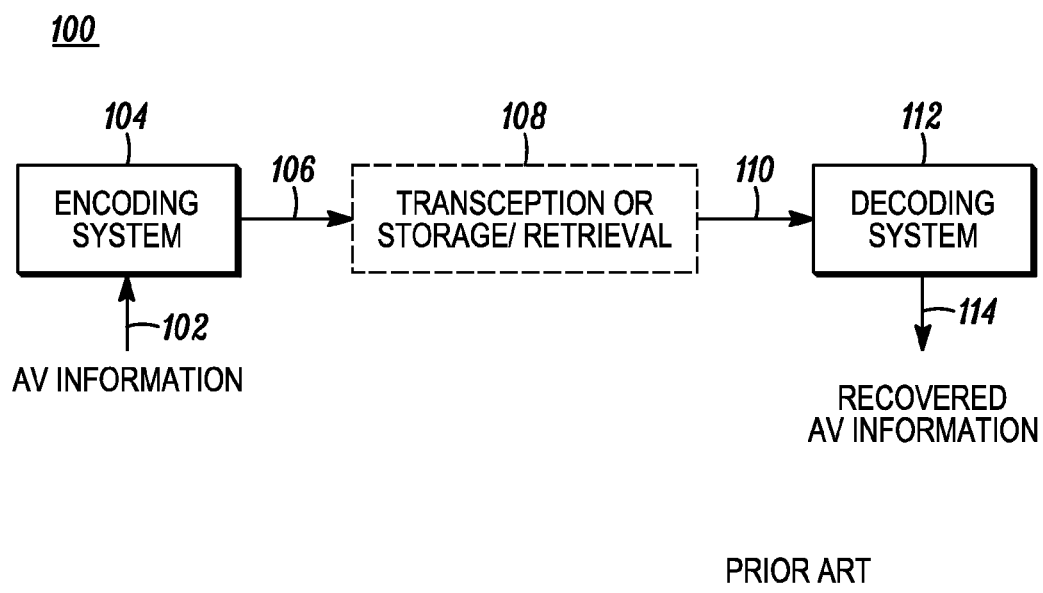
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
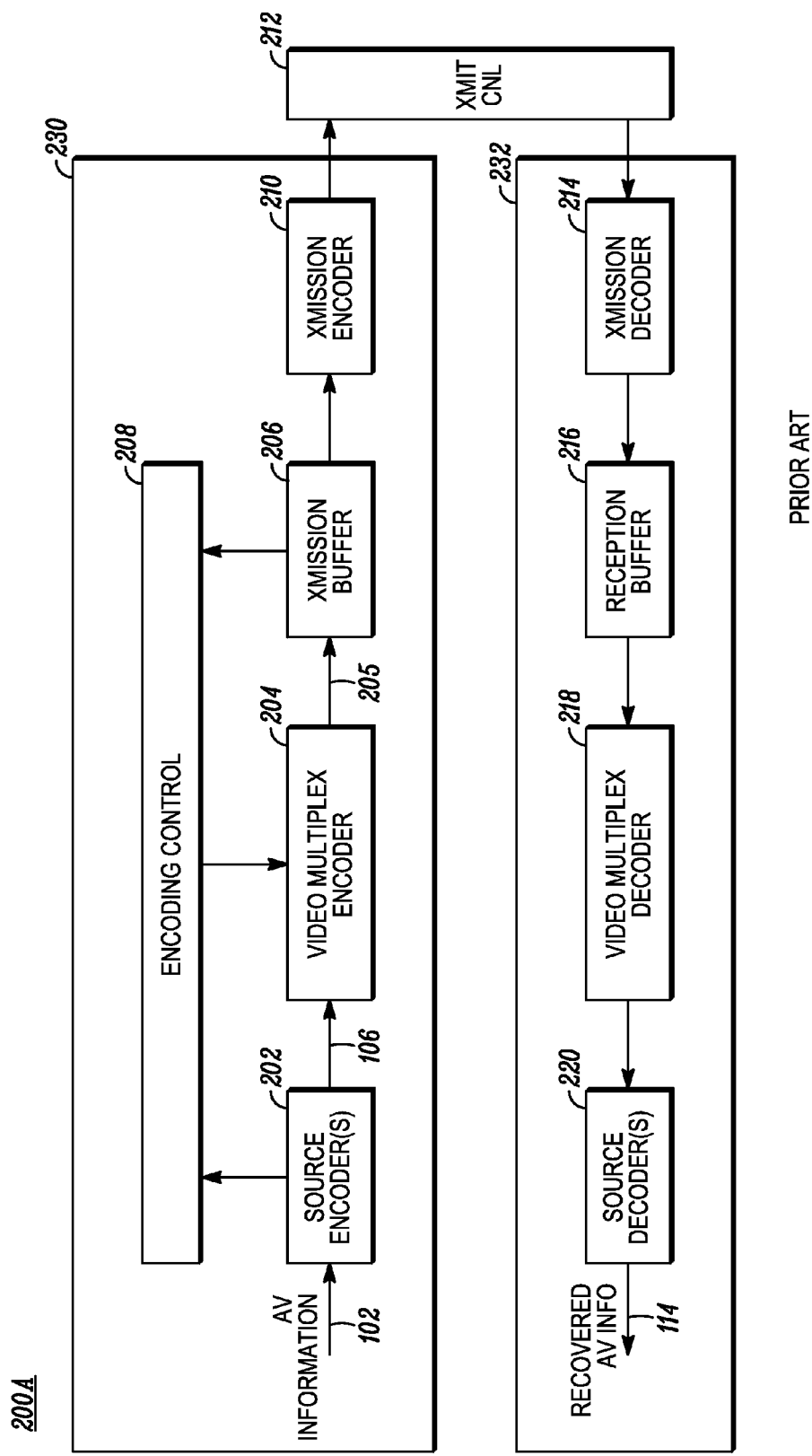
FIG. 2A is a diagram of one embodiment of a codec system in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error correcting systems may be included to reduce or eliminate such errors. For example, the encoded AV information 106 may be forward error correction (FEC) encoded by adding redundant information, and such redundant information can be used to identify and eliminate errors in the reception segment 230.

The transmission segment 102 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 106 according to certain performance parameters that affect the instantaneous bit rate, the signals from each of the source encoders 106 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a coding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented.

In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
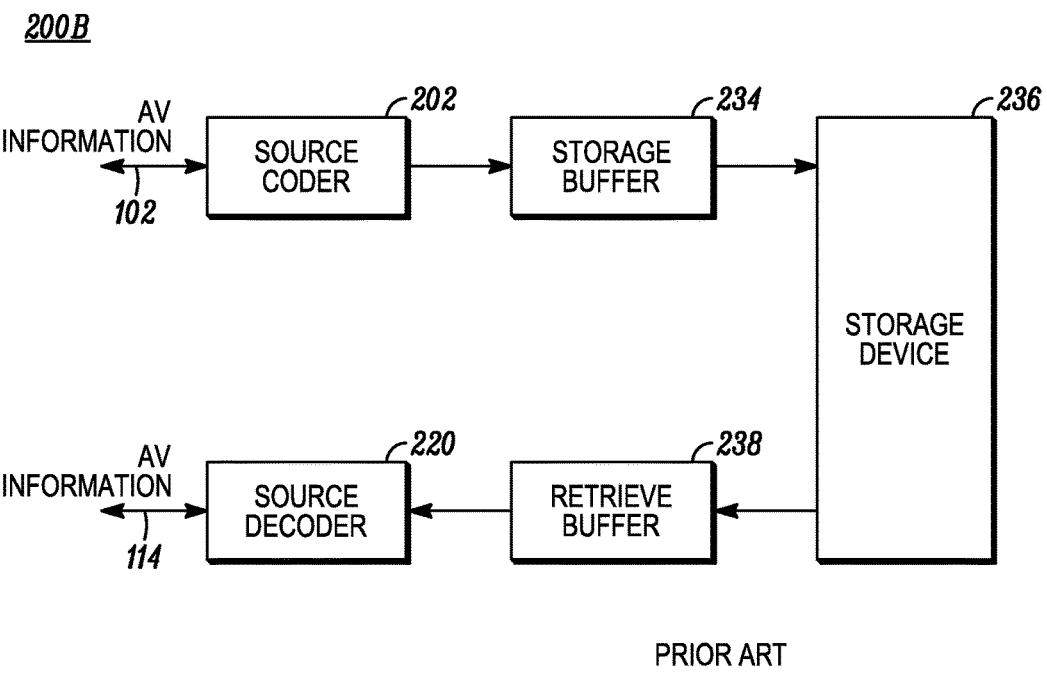
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
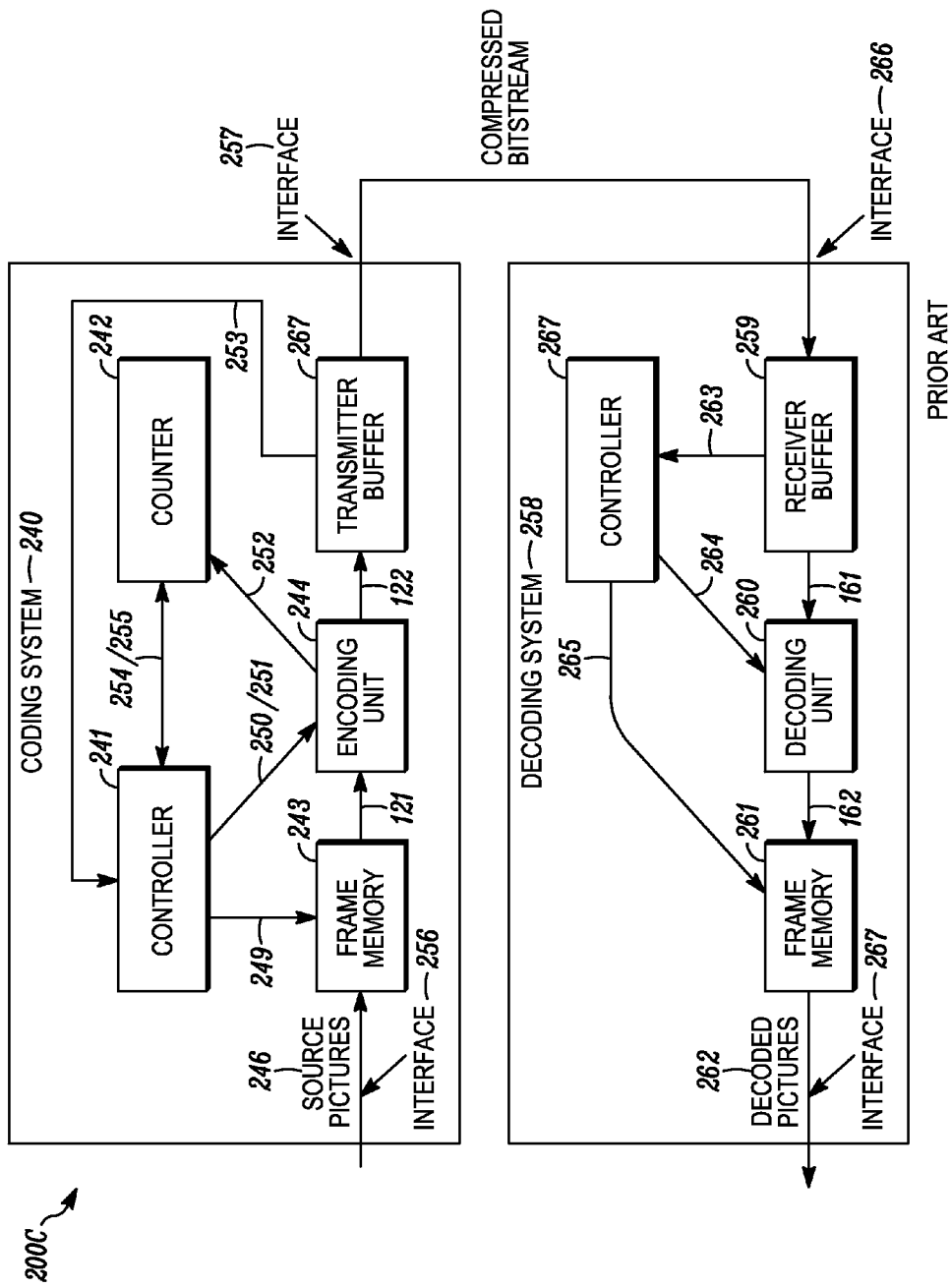
FIG. 2C is another diagram depicting an exemplary content distribution system comprising a coding system and a decoding system that can be used to transmit and receive HEVC data.

FIG. 2C is another diagram depicting an exemplary content distribution system 200C comprising a coding system or encoder 202 and a decoding system or decoder 220 that can be used to transmit and receive HEVC data. In some embodiments, the coding system 202 can comprise an input interface 256, a controller 241 a counter 242 a frame memory 243, an encoding unit 244, a transmitter buffer 267 and an output interface 257. The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 267 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures utilizing the controller 241. The frame memory 243 can have a first area that can be used for storing the incoming frames from the source pictures 246 and a second area that can be used for reading out the frames and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 202 to start an encoding operation, such as preparing the Coding Units based on a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 267.

The encoded video signal 248, including the generated video compression data, can be stored in the transmitter buffer 267. The information amount counter 242 can be incremented to indicate the total amount of data in the transmitter buffer 267. As data is retrieved and removed from the buffer, the counter 242 can be decremented to reflect the amount of data in the transmitter buffer 267. The occupied area information signal 253 can be transmitted to the counter 242 to indicate whether data from the encoding unit 244 has been added or removed from the transmitter buffer 267 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 267.

The information amount counter 242 can be reset in response to a preset signal 254 generated and output by the controller 241. After the information amount counter 242 is reset, it can count data output by the encoding unit 244 and obtain the amount of video compression data and/or video packets which have been generated. The information amount counter 242 can supply the controller 241 with an information amount signal 255 representative of the obtained amount of information. The controller 241 can control the encoding unit 244 so that there is no overflow at the transmitter buffer 267.

In some embodiments, the decoding system 220 can comprise an input interface 266, a receiver buffer 259, a controller 267, a frame memory 261, a decoding unit 260 and an output interface 267. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 220. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 263 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 267.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Prior art encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below. CS39543/CS39549/CS39892

Figure 3:
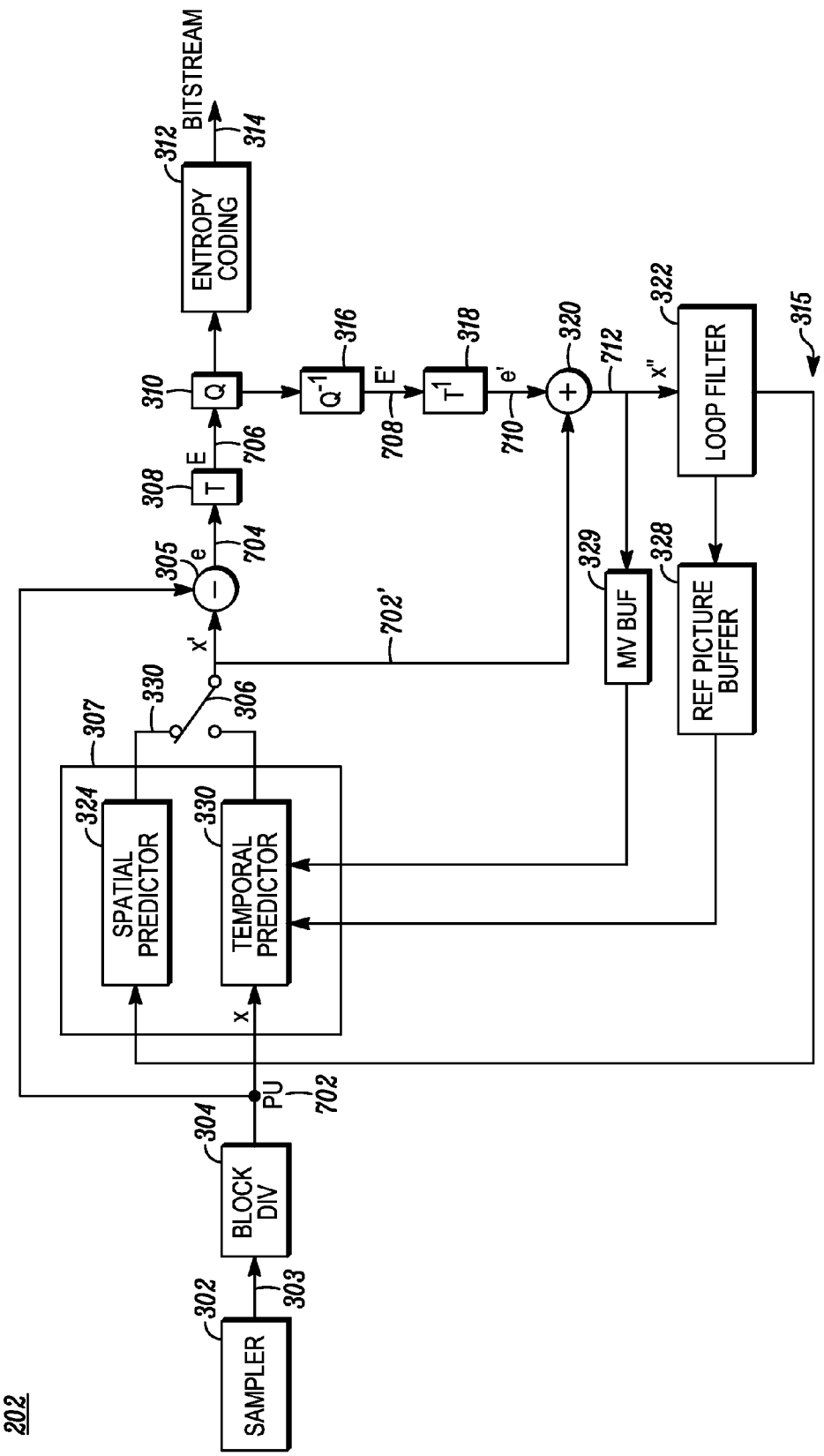
FIG. 3 is a block diagram illustrating one embodiment of the source encoder.

FIG. 3 is a block diagram illustrating one embodiment of the source encoder 202. The source encoder 202 accepts AV information 102 and uses sampler 302 sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks 102, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
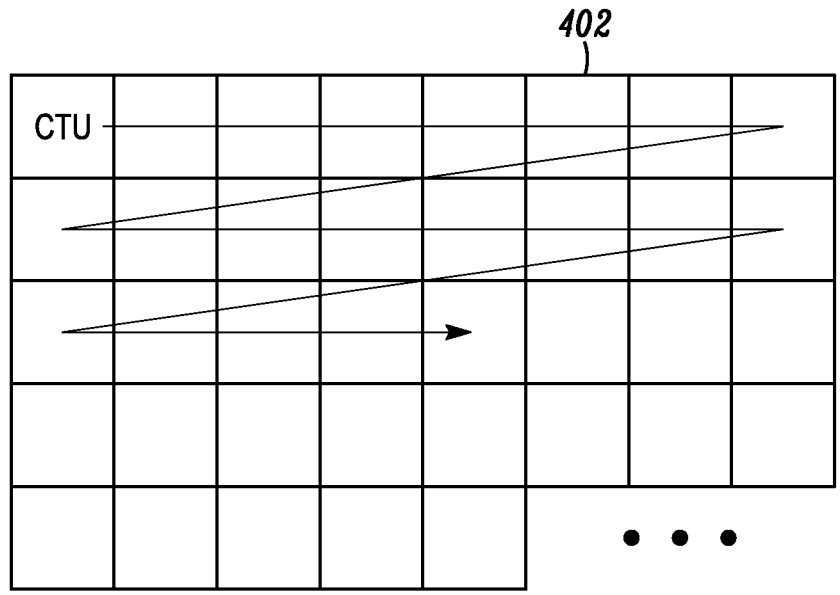
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
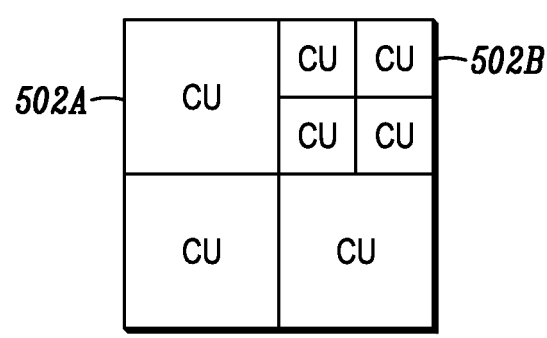
FIG. 5 is a diagram showing an exemplary partition of a coding tree block into coding units.

FIG. 5 is a diagram showing an exemplary partition of an CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
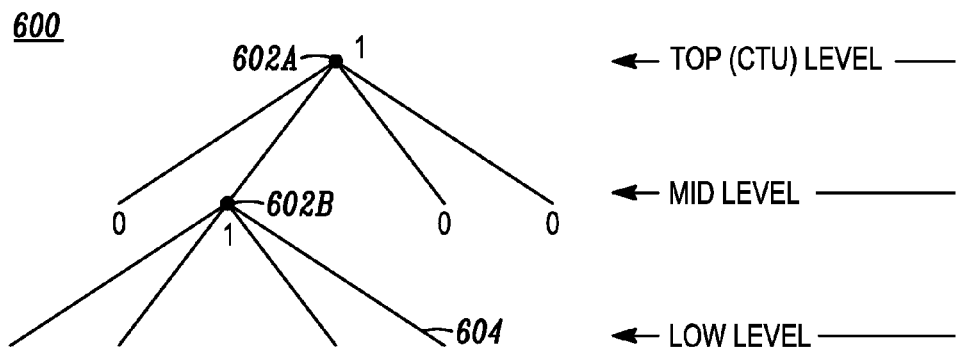
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and a transform units (TUs), both of which have a maximum size equal to the size of the corresponding CU 502.

Figure 7:
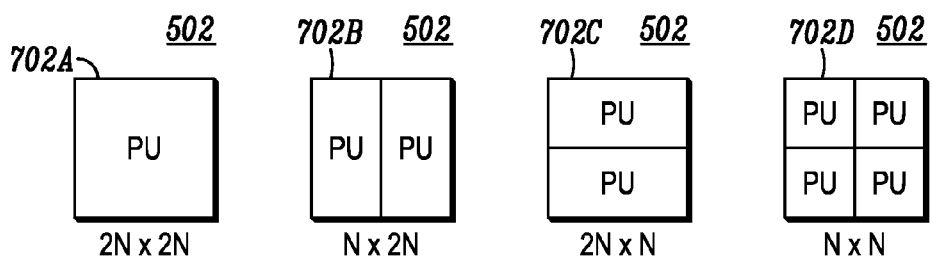
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D)), as shown in FIG. 7.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
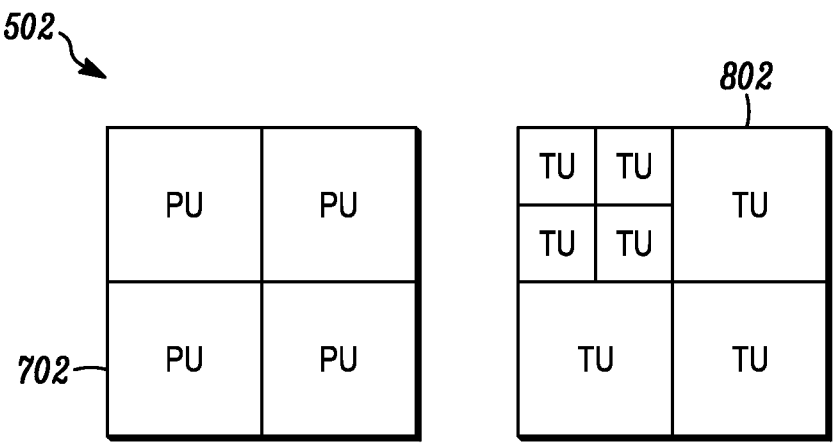
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a DCT (Discrete Cosine Transform). The size and location of each block transform TU 802 within a CU 502 is described by a "residual" quadtree (RQT) further illustrated below.

Figure 9:
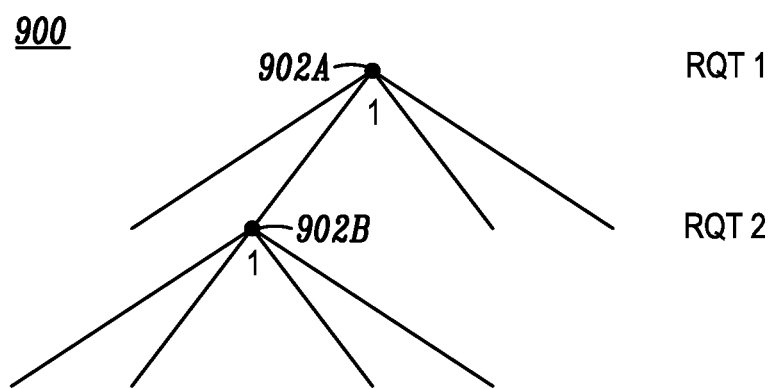
FIG. 9 is a diagram showing RQT codetree for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
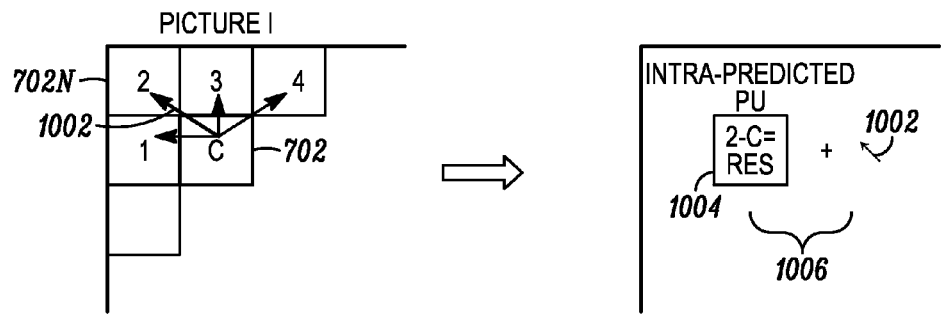
FIG. 10 is a diagram illustrating spatial prediction of prediction units.

FIG. 10 is a diagram illustrating spatial prediction of PUs 702. A picture i may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 (e) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
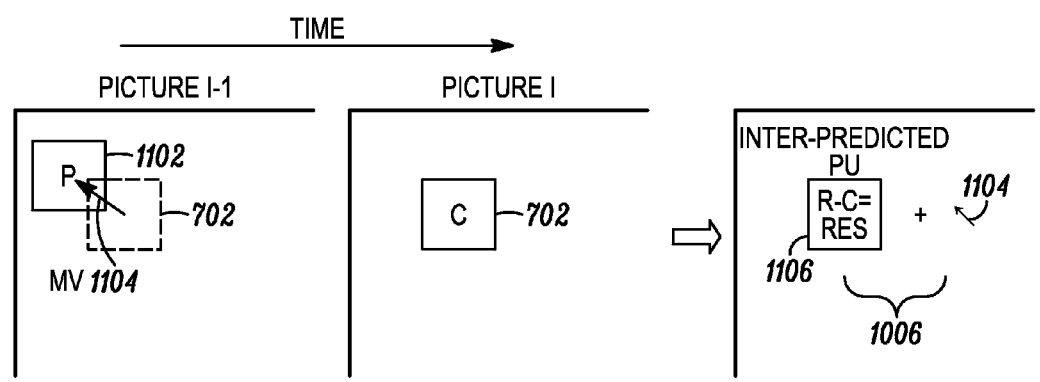
FIG. 11 is a diagram illustrating temporal prediction.

FIG. 11 is a diagram illustrating temporal prediction. Temporal prediction considers information from temporally neighboring pictures or frames, such as the previous picture, picture i−1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that is defines the displacement between the current PU 702 in current frame (picture i) and the reference area 1102 (refIdx) in the reference frame (picture i−1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1106. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
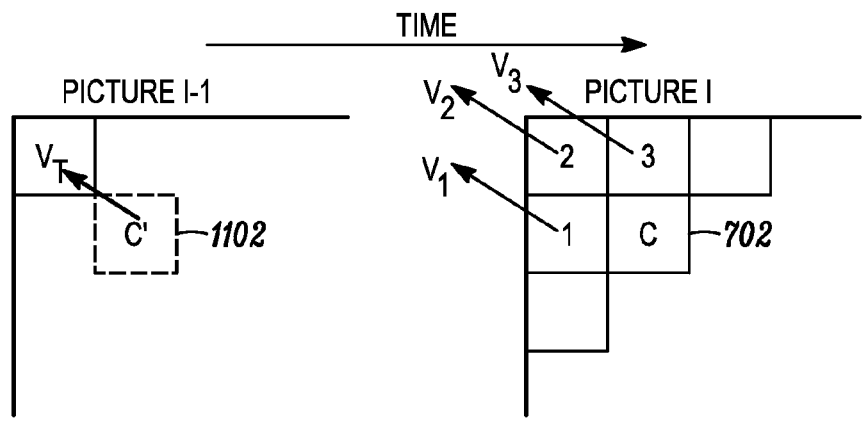
FIG. 12 is a diagram illustrating the use of motion vector predictors (MVPs)

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor $V_T$ which is the motion vector of the co-located block C' in a previously decoded picture (in decoding order) of the sequence (e. g. block of picture i−1 located at the same spatial position as the block being coded (block C of image i).

The components of the spatial motion vector predictors $V_1$, $V_2$ and $V_3$ and the temporal motion vector predictor $V_T$ can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) $V_T$ is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

Referring back to FIG. 3, the intra-predicted residuals 1004 and the inter-predicted residuals 1106 obtained from the spatial (intra) or temporal (inter) prediction process are then transformed by transform module 308 into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 310 as a part of the useful data coding the images of the AV information. Coding syntax elements may also be coded using spatial dependencies between syntax elements to increase the coding efficiency. HEVC offers context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

The filtered images, also known as reconstructed images, are then stored as reference images from reference image buffer 328 in order to allow the subsequent "Inter" predictions taking place during the compression of the subsequent images of the current video sequence.

Reference Image Syntax

As described above, to reduce errors and improve compression, HEVC permits the use of several reference images for the estimation and motion compensation of the current image. Given a current PU 702 in a current picture, the collocated PU 1102 for a particular slice resides in associated nearby reference/non-reference picture. For example, in FIG. 12, the collocated PU 1102 for current PU 702 in picture (i) resides in the associated nearby reference picture (i–1). The best "inter" or temporal predictors of the current PU 702 are selected in some of the multiple reference/non-reference images, which may be based on pictures temporally prior to or after the current picture in display order (backwards and forward prediction, respectively).

For HEVC, the index to reference pictures is defined by reference picture lists that are described in the slice syntax. Forward prediction is defined by list_0 (RefPicList0), and backward prediction is defined by list_1 (RefPicList1), and both list 0 and list 1 can contain multiple reference pictures prior to or/and later than the current picture in the display order.

Figure 13:
FIG. 13 illustrates an example of the use of the reference picture lists.

FIG. 13 illustrates an example of the use of the reference picture lists. Consider pictures 0, 2, 4, 5, 6, 8 and 10 shown in FIG. 13, wherein the numbers of each picture denote display order and the current picture is picture 5. In this case, the list_0 reference pictures with ascending reference picture indices and starting with index equal to zero are 4, 2, 0, 6, 8 and 10, and the list_1 reference pictures with ascending reference picture indices and starting with index equal to zero are 6, 8, 10, 4, 2, and 0. A slice that the motion compensated prediction is restricted to the list_0 prediction is called a predictive or P-slice. Collocated pictures are indicated by using the collocated_ref_idx_index in the HEVC. A slice for which the motion-compensated prediction includes more than one reference picture is a bi-predictive or B-slice. For B-slices, the motion compensated prediction may include reference pictures from list_1 prediction as well as list_0.

Hence, a collocated PU 1102 is disposed in a reference picture specified in either list_0 or list_1. A flag (collocated_from_l0_flag) is used to specify whether the collocated partition should be derived from list_0 or list_1 for a particular slice type. Each of the reference pictures is also associated with a motion vector.

The storage and retrieval of reference pictures and related motion vectors for the emerging HEVC standard is expressed in paragraph 8.4.1.2.9 of Benjamin Bross, Woo Jin Han, Jens-Rainer Ohm, Gary J. Sullivan, Thomas Wiegand, "WD4: Working Draft 4 of High-Efficiency Video Coding," Joint Collaborative Team on Video Coding (JCT-VC) of ITU-T SG16 WP3 and ISO/IEC JTC1/SC29/WG11, JCTVC-F803_d5, 6th Meeting: Torino, IT, 14-22 Jul. 2011 (hereby incorporated by reference herein).

According to the standard, if the slice_type is equal to B and the collocated_from_l0_flag is 0, the collocated_ref_idx variable specifies the reference picture as the picture that contains the co-located partition as specified by RefPicList1. Otherwise (slice_type is equal to B and collocated_from_l0_flag is equal to 1 or slice_type is equal to P), the collocated_ref_idx variable specifies the reference picture as the picture that contains the collocated partition as specified by RefPicList0.

Figure 14:
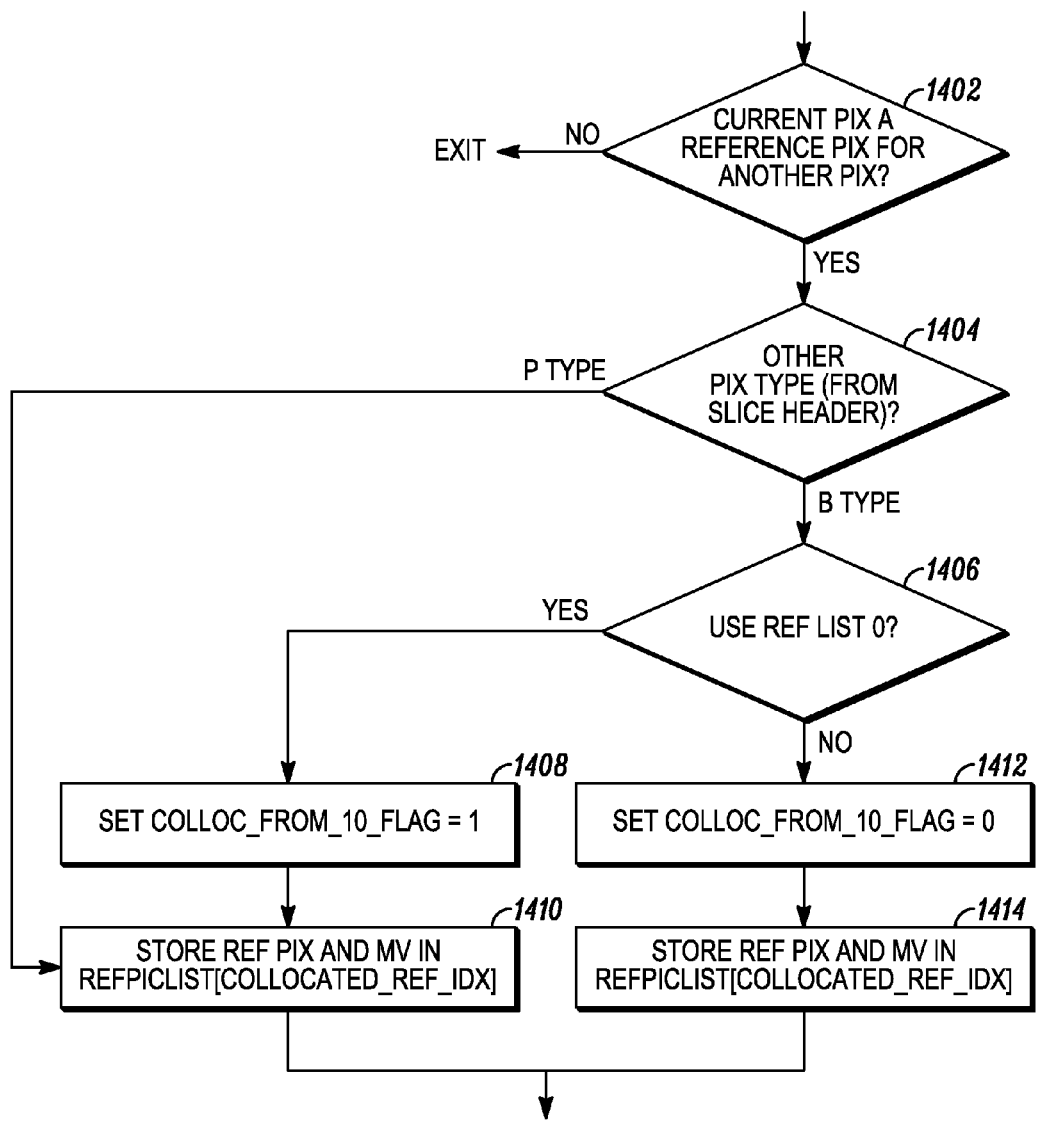
FIG. 14 is a diagram illustrating processes performed by the encoder according to the aforementioned standard.

FIG. 14 is a diagram illustrating processes performed by the encoder 202 according to the aforementioned standard. Block 1402 determines whether the current picture is a reference picture for another picture. If not, there is no need to store reference picture or motion vector information. If the current picture is a reference picture for another picture, block 1504 determines whether the "another" picture is a P-type or a B-type picture. If the picture is a P-type picture, processing is passed to blocks 1410, which set the colloc_from_l0_flag to one and store the reference picture and motion vector in list 0. If the "another picture" is a B-type picture, block 1406 nonetheless directs processing to blocks 1408 and 1410 if the desired reference picture is to be stored in list 0, and to blocks 1412 and 1414 if the desired reference picture and motion vector is to be stored in list 1. This decision may be based on whether it is desirable to select reference pictures from a temporally preceding or succeeding picture. Which of the multiple possible reference pictures is selected is determined according to the collocated_ref_idx index.

Figure 15:
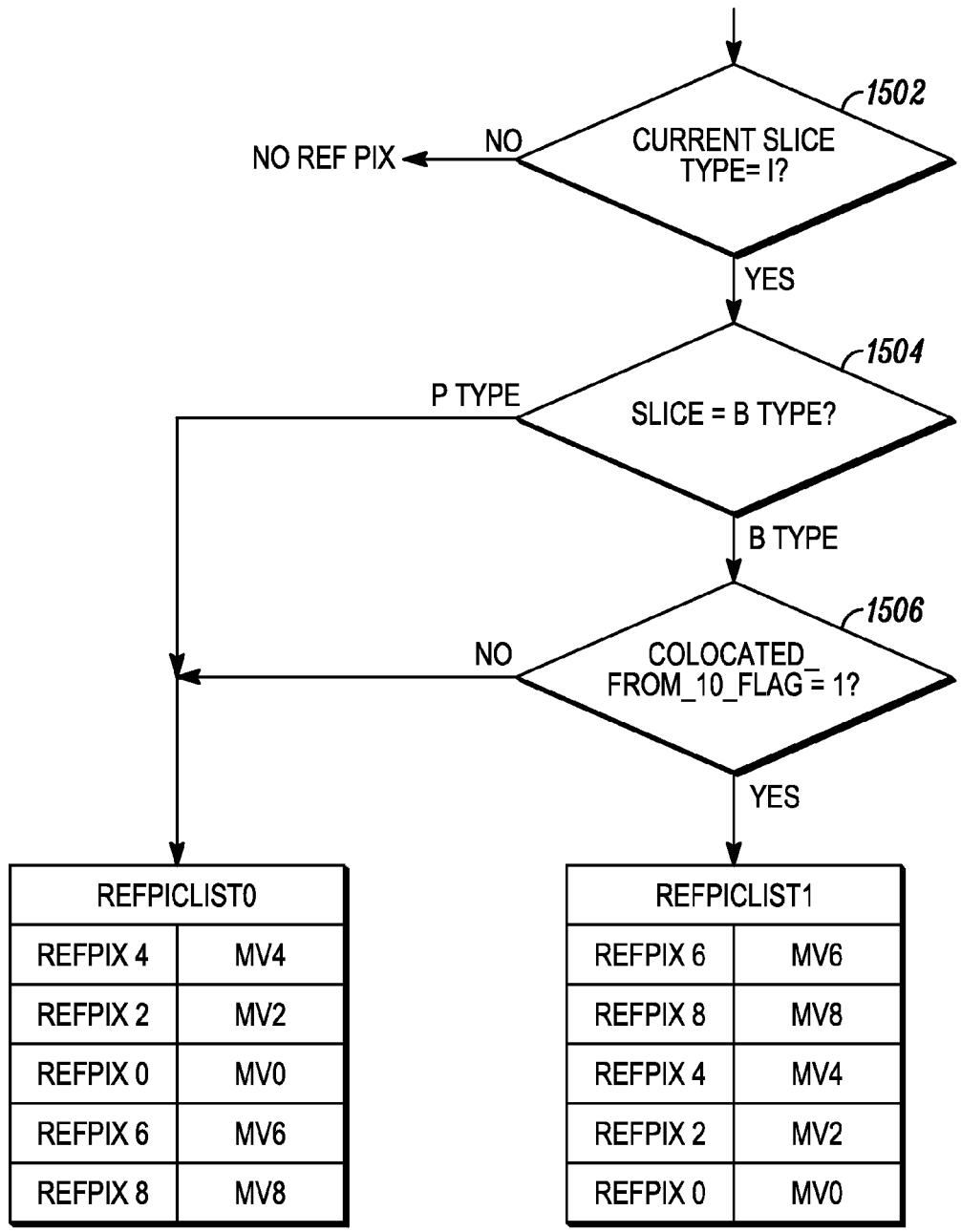
FIG. 15 depicts the use of a the collocated_from_10_flag by the decoder in decoding a according to the emerging HEVC standard.

FIG. 15 depicts the use of a the collocated_from_l0_flag by the decoder 220 in decoding a according to the previous HEVC standard. Block 1502 determines if the current slice type being computed is an intra or I-type. Such slices do not use temporally nearby slices in the encoding/decoding process, and hence there is no need to find a temporally nearby reference picture. If the slice type is not I-type, block 1504 determines whether the slice is a B-slice. If the slice is not a B-type, it is a P-type slice, and the reference picture that contains the collocated partition is found in list 0, according to the value of collocated_ref_idx. If the slice is B-type, the collocated_from_10_flag determines whether the reference picture is found in list 0 or list 1. As the index indicates, the collocated picture is therefore defined as the reference picture having the indicated collocated_ref_idx in either list 0 or list 1, depending on the slice type (B-type or P-type) and the value of the collocated_from_10_flag. In one embodiment of HEVC, the first reference picture (the reference picture having index [0] as shown in FIG. 13 is selected as the collocated picture).

Baseline Slice Header Syntax

FIGS. 16A-16C are diagrams presenting a baseline slice header logic and syntax. In the diagrams, indentation of the text indicates the logical structure of the syntax, wherein the delimeter "||" represents a logical "OR," "&&" represents a logical "AND," "!" represents a logical inverse or complement. Further, if a logical condition statement (e.g. "if" statement is true, the operations indented from the logical if statement (and enclosed in brackets "{ }" are performed, otherwise processing continues to the next logical statement.

Turning first to FIG. 16A, slice processing syntax differs depending upon whether the slice is the first of a plurality of slices in a picture, of if it is not the first slice in the picture. Accordingly, the slice header comprises a first slice in picture flag (first_slice_in_pic_flag) that is read. This is illustrated in syntax 1602.

As described earlier, the HEVC standard includes a plurality of NAL unit types that include a video parameter set (VPS), a sequence parameter set (SPS) which presents parameters for a sequence of pictures, and a picture parameter set (PPS) which describes parameters for a particular picture. An identifier of the picture parameter set (pic_parameter_set_id) is also read. If the slice is not the first slice in the picture, the slice address is read. This is illustrated in syntax 1606

As described above, slices may include non-dependent slices or dependent slices, and the slice header syntax permits the disabling or enabling of the use of dependent slices altogether. The next logic uses a previously read flag (dependent_slice_enabled_flag) that signals that dependent slices are enabled and the first_slice_in_pic_flag to determine whether to read the dependent_slice_flag. Note that if the slice is the first slice in the picture, the dependent slice flag for this slice is not read, as the slice cannot be a dependent slice under such circumstances. If the slice is not a dependent slice, the logic that follows reads the slice type and other parameters that are used in later processing for all slice types (I, P, and B). Further processing shown in syntax 1612 is also performed.

Turning now to FIG. 16B, syntax 1614 reads a variable aps_id if the adaptive_loop_filter_enabled_flag read in the sequence parameter set (SPS) is enabled.

Syntax 1615 includes a conditional statement testing whether the slice_type data read earlier in the slice header indicates if the slice type is either P or B. If the slice type is neither P or B, processing is routed to determine whether read reference picture list (ref_pic_list_modification) is read or not, as further discussed below with reference to syntax 1619. If the slice type is a P or B, the logic uses an sps_temporal_mvp_enable_flag that was read as a part of the SPS header syntax to determine if the slice may be decoded using temporal motion vector predictor. If the flag is set, indicating that temporal motion vector predictor may be enabled, a flag describing whether temporal motion vector predictor is permitted for the picture containing the slice (pic_temporal_mvp_enable_flag) is read.

Regardless of the status of the sps_temporal_mvp_enable_flag, another flag (num_ref_idx_active_override_flag) is read as shown in syntax 1617. This flag indicates whether a parameter (num_ref_10_active_minus1) describing the maximum reference picture list index for list_0 (P-type) or another parameter (num_ref_idx_11_active_minus1) describing the maximum reference picture list index for list_1 (B-type) are present in the slice header. If the (num_ref_idx_active_override_flag) tests positive, the num_ref_inx_10_active_minus1 parameter is read, and if the slice is a B-type slice, the num_ref_inx_11_active_minus1 parameter is also read, as shown in syntax 1618

HEVC permits the baseline of the reference pictures to be modified in the encoding process. Without regard for the slice type (since the operations that follow are not within the conditional if syntax 1615 testing whether the slice is a P-type or a B-type) a previously read flag (lists_modification_present_flag) is read, in one embodiment, from the PPS. If the lists_modification_present_flag tests as a logic 1, reference list modifications (ref_pic_list_modification( )) syntax is executed.

This information is used by the ref_pic_list_modification syntax to read, based on the slice type, a flag (reference_pic_list_modification_flag_10) identifying whether the slice was encoded according to an implicit reference picture list (if the flag is a logical zero or not provided) or if the reference picture list for the reference picture list associated with the slice is to be explicitly defined (if the flag is logical 1), in which case list entries for the reference picture list are read. As described further below, the baseline ref_pic_list_modification( ) syntax includes logical conditional statements based on the slice-type, which are simplified in the solutions described below.

Next, the slice header logic again determines whether the slice under consideration is a B-type slice, and if so, reads an mvd_11_zero_flag. The mvd_11_zero_flag is not applicable to P-type slices, and indicates whether the motion vector difference coding syntax structure used with B-type slices is parsed or not. This is shown in syntax 1620.

As described above with reference to the encoder 312 illustrated in FIG. 3, HEVC implements context adaptive coding such as context adaptive binary arithmetic coding, or CABAC. CABAC is a form of entropy encoding that encodes binary symbols using probability models. A non-binary valued symbol (such as a transform unit coefficient or motion vector) is binarized or converted into a binary code prior to arithmetic coding. Stages are repeated for each bit (or "bin") of the binarized symbol.

A context model is a probability model for one or more bins of the binarized symbol. This model may be chosen from a plurality of available models depending on the statistics of recently-coded data symbols. The context model stores the probability of each bin being "1" or "0". An arithmetic coder then encodes each bin according to the selected probability model.

A context variable is a variable specified for the adaptive binary arithmetic decoding process of a bin by an equation containing recently decoded bins. A cabac_init_flag specifies the method for determining the initialization table used in the initialization process for context variables. The value of cabac_init_flag is either 0 to 1, inclusive. When cabac_init_flag is not present, it is inferred to be 0.

Returning to FIG. 16B, without regard for the outcome of the logic determining if the slice was is an inter-predicted (P or B type) slice as described in syntax 1615 above, the slice header logic checks whether the slice type is not an I-type and a signaling flag (cabac_init_present_flag) indicating whether a context variable initialization flag (cabac_init_flag) is present in the slice header and should be read. If the slice type is not an I-type and the signaling flag indicates that the context variable initialization flag is present in the slice header, the context variable initialization flag is read. The context variable initialization variable flag specifies the method for determining the initialization table used in the context variable initialization process. This is shown in syntax 1622.

Without regard for the outcome of the syntax 1615 determining if the slice was is an inter-predicted (P or B type) slice, the slice header logic reads a variable (slice_qp_delta) describing the initial value for a quantization parameter to be used in coding blocks of data is read. This initial value is used until modified in the coding unit. This is illustrated by syntax 1624.

As described above, the loop filter 322 of the encoder/decoder may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

Returning to FIG. 16B, the slice header logic performs deblocking filter logic, as illustrated with respect to syntax 1626. This step is performed without regard for the outcome of the logic determining if the slice was is an inter-predicted (P or B type) slice as described in syntax 1615 above. First, the slice header logic determines whether a deblocking filter control is enabled by checking the status of a control flag (deblocking_filter_control_present_flag) in the picture parameter set (PPS). If the flag tests true, logic checks to determine if the deblocking filter is overridden by checking another flag (deblocking_filter_override_enabled_flag) which indicates that the slice header for pictures referring to the PPS have a deblocking_filter_override_flag. If this filter is enabled, a flag (deblocking_filter_override_flag) is read that indicates that the deblocking filter is to be overridden. Logic then determines whether the deblocking override filter is set, and if so, reads a slice header level flag (slice_header_disable_deblocking_filter_flag) (that indicates whether the deblocking filter should be disabled. If the slice_header_disable_deblocking_filter_flag is not set, then the slice header logic reads the beta_offset_div2 and tc_offset_div2_data, which specify default deblocking parameter offsets.

Next, the slice header logic performs operations related to determining the location of the collocated picture used for temporal motion vector predictor. The slice header first checks if temporal motion vector predictor is enabled on a slice/picture level by checking the pic_temporal_mvp_enable_flag, as shown in syntax 1628. If the flag is not set, processing is directed to the weighted prediction discussed further below. If the flag is set, the slice header logic determines if the slice type is B, as shown in syntax 1630. If the slice type is B, the slice header logic reads the collocated_from_l0_flag, as shown in syntax 1632. Next, the logic determines if the slice type is not I-type and either (1) the logical combination of the collocated_from_l0_flag and the num_ref_idx_l0_active_minus1 is greater than zero or (2) the logical combination of the inverse of the collocated_from_l0_flag and the num_ref_idx_active_minus1 is greater than zero). If either of these possibilities tests to a logical 1 (or True), the collocated reference index (collocated_ref_idx) is read, as shown in syntax 1634.

HEVC and previous coding standards permitted a scaling and offset operation that is applied to prediction signals in a manner known as weighted prediction. Whereas H.264/MPEG-4 AVC supported both temporally-implicit and explicit weighted prediction, in HEVC, only explicit weighted prediction is applied, by scaling and offsetting the prediction with values sent explicitly by the encoder. The bit depth of the prediction is then adjusted to the original bit depth of the reference samples. In the case of uni-prediction, the interpolated (and possibly weighted) prediction value is rounded, right-shifted, and clipped to have the original bit depth. In the case of bi-prediction, the interpolated (and possibly weighted) prediction values from two PBs are added first, and then rounded, right-shifted and clipped.

In previous coding standards, up to three stages of rounding operations are required to obtain each prediction sample (for samples located at quarter-sample positions. Thus, if bi-prediction is used, the total number of rounding operations is then seven in the worst case. In HEVC, at most two rounding operations are needed to obtain each sample located at the quarter-sample positions, thus five rounding operations are sufficient in the worst case when bi-prediction is used. Moreover, in the most common case, where the bit depth B is 8 bits, the total number of rounding operations in the worst case is further reduced to three. Due to the lower number of rounding operations, the accumulated rounding error is decreased and greater flexibility is enabled in regard to the manner of performing the necessary operations in the decoder.

Returning to FIG. 16B, the slice header logic uses the slice type and flags indicating whether weighted prediction or biprediction is to be enabled. The weighted_pred_flag is set equal to logical 0 to indicate that the weighted prediction is not applied to P slices, and set to logical 1 to indicate that weighted prediction is applied to P slices. The weighted_bipred_flag is set to logical 0 to specify that the default weighted prediction is applied to B slices, and set to logical 1 specifies that weighted prediction is applied to B slices. The slice header logic therefore includes logic to read the prediction weight table ((pred_weight_table( )) if the weighted_pred_flag is set to a logical 1 and the slice type is P or if the weighted_bipred_flag is set to a logical 1 and the slice type is B, as shown in syntax 1636.

A maximum number of motion vector prediction candidates that are supported in the slice can be specified. In the slice header logic, this specified such as the difference between the number "5" and the maximum number, and is referred to as five_minus_max_num_merge_cand. In the next slice header logic, if the slice type is a P type or a B type, the five_minus_max_num_merge_cand is read, as shown in syntax 1638. Since the maximum number of candidates is typically five, the number read is typically zero.

Slice-level adaptive loop filtering has been included in some editions of the HEVC standard. In such editions, the slice header logic detects whether adaptive loop filtering is enabled by checking the adaptive_loop_filter_enabled_flag. If the adaptive_loop_filter_enabled_flag is set to a logical 1, the slice_adaptive_loop_filter_flag is read, indicating whether adaptive loop filtering is to be performed on a slice level. This is shown in syntax 1640.

The slice_adaptive_loop_filter_flag is then used to determine whether adaptive loop filtering parameters (alf_param( )) are read when adaptive loop filtering coefficients are in the slice (indicated by an alf_coef_in_slice_flag) or different parameters (alf_cu_control_param( )) when the adaptive loop filtering coefficients are not in the slice, as shown in syntax 1640.

Finally, HEVC permits in-loop filtering operations to be performed across left and upper boundaries of the current slice. Previous editions of the HEVC slice header included a slice_loop_filter_across_slices_enabled_flag, that when set equal to 1 specifies that these in-loop filtering operations (include the deblocking filter and sample adaptive offset filter) are performed across the left and upper boundaries of the current slice; otherwise, the in-loop operations are not applied across left and upper boundaries of the current slice. The logic of syntax 1642 reads the slice_loop_filter_across_slices_enabled_flag if the feature is enabled on a sequence level (e.g. the seq_loop_filter_across_slices_enabled_flag is set and either the slice_adaptive_loop_filter_enable) flag or the slice_sample_adaptive_offset_flag is set, or the disable_deblocking_filter_flag is not set, as shown in syntax 1642. The remaining slice header syntax logic 1644 relates to the use of tiles or slice header extensions.

Modified Slice Header Syntax

The baseline slice header design includes syntax and function calls, even under the same logic conditions (for example, under the same slice type), spread in different locations in slice header. Although such a design is necessary when the functionality involved includes dependencies or causal relationships that must be maintained, they can result in unnecessary logic condition checking. This is particularly pernicious when used at a slice header level, as a typical media program comprises a large number of slices, and hence, a large number of slice headers. Modified slice header syntaxes are presented below that reduce or eliminate excessive bits and logical tests where unnecessary.

First Solution: Appending Slice Quantization Parameter Initial Values and Deblocking Parameters after Grouped P and B Type Logic Conditions FIGS. 17A and 17B present syntax diagrams illustrating one embodiment of an improved slice header syntax. In this embodiment, all relative function calls performed for P and B type slices are grouped together, and the slice_qp_delta and deblocking related syntax are disposed after such function calls.

More specifically, the baseline slice header, syntax 1616-1618 was performed if the slice type tested as P-type or B-type, otherwise, logic skipped to syntax 1619 and the statements that followed. In the first solution, additional logic is brought within the conditional statement and simplified to eliminate unnecessary function calls. Specifically, in the first solution, the temporal motion vector predictor logic of syntax 1616 and reference index override logic of syntax 1617-1618 remain unchanged. However, other logic is also performed if the conditional statement of syntax 1615 tests true. This includes the ref_pic_list_modification ( )-related syntax 1619, the mvd_l1_zero_flag-related syntax 1620, the CABAC initialization flag-related syntax 1622, the temporal motion vector predictor syntax 1628-1634 for reading the collocated reference index, and the weighted prediction table syntax 1636.

In addition, unnecessary function calls are eliminated. For example, in the baseline slice header structure, the reference_pic_list_ modification( ) syntax itself includes a conditional test to determine if the slice is a P or B slice. Moving syntax 1619 under the conditional test 1615 allows the test in the reference_pic_list_modification( ) to be eliminated. Further, the baseline CABAC-related syntax 1622 of the slice header includes a conditional test to determine if the slice is an I-type slice. That conditional test is eliminated by placing the CABAC-related syntax 1622 within the logic of syntax 1615. Further, syntax 1638 for the reading of the five_minus_max_num_merge_cand parameter no longer requires its own preceding logic to assure that it is read only if the slice type is P or B (as was the case in the baseline syntax shown in FIG. 16B), since this read operation is now performed under the logical condition in the syntax 1615.

FIGS. 17A and 17B are diagrams of an exemplary improved slice header syntax. FIGS. 17A and 17B will be discussed with reference to FIGS. 18A and 18B, which present a flow chart of the logic presented in FIGS. 17A and 17B.

Figure 18A:
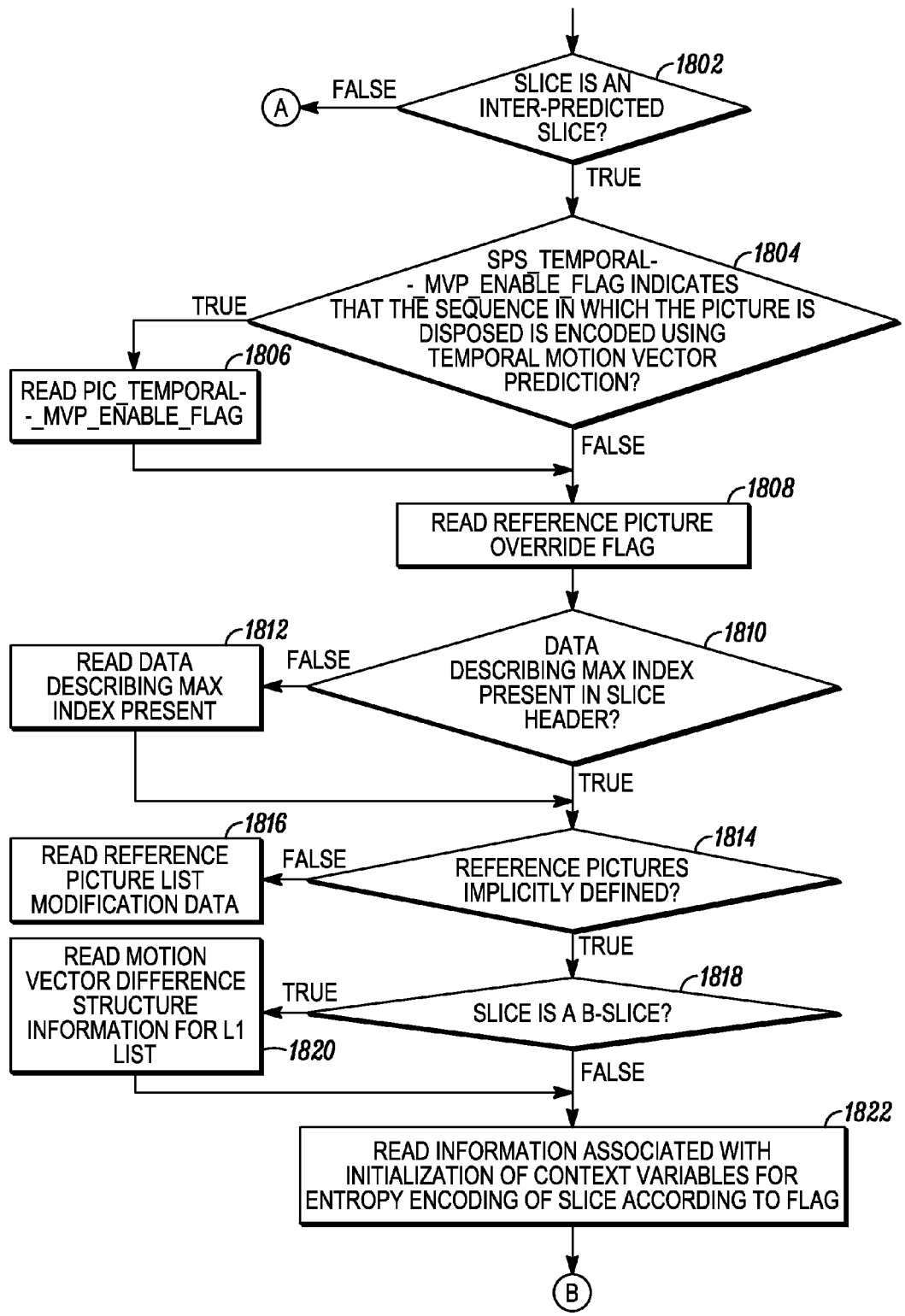
FIGS. 18A and 18B are diagrams illustrating exemplary operations that can be performed in accordance with the slice header shown in FIGS. 17A and 17B.

Turning fist to FIG. 18A, a determination is made in block 1802 regarding whether the slice is an inter-predicted slice or not. This is shown, for example, by syntax 1701, which tests whether the slice type is P-type or B-type. In another embodiment, this can be implemented by logic testing whether the slice type is not I-type.

If the slice is not an inter-predicted slice, logic is passed to the slice_qp_delta processing syntax 1716 of FIG. 17B. If the slice is an inter-predicted slice (that is, either an P-type slice or a B-type slice, but not an I-type slice), logic proceeds to block 1804, which tests whether the sps_temporal_mvp_enable_flag indicates that the sequence in which the picture is disposed may be encoded using temporal motion vector predictor, and if so, a pic_temporal_mvp_enable_flag is read in block 1806. This is also illustrated in syntax 1702. Processing is passed to block 1808, which reads the reference picture override flag (num_ref_idx_active_override_flag), also illustrated in syntax 1703. Block 1810 tests whether the slice header includes data describing the maximum reference index, and if so, the data describing this maximum index is read, as shown in block 1812. As further shown in the syntax 1704, the num_ ref_ idx_l0_active_minus1 parameter is read if the slice is a P-slice, and both that num_ref_idx_l0_active_minus1 and the num_ref_idx_l1_active_minus1 parameters are read if the slice is a B-slice.

Block 1814 determines whether the reference pictures are implicitly defined. If the reference pictures are not to be implicitly defined, but rather obtained from a list, processing is passed to block 1816 where reference picture list modification data is read, and processing is passed to block 1818. Otherwise, processing is passed to block 1818 without reading the reference picture list modification data. This is also illustrated by the syntax 1705 shown in FIG. 17A. Note that the processing shown in syntax 1705 can be made without reference (e.g. a conditional logic using) the slice type, as this operation is pertinent to all P-type slices and B-type slices, and this condition was determined in syntax 1701.

Information indicating a structure of motion vector differences for L1 list used in the motion compensation prediction are read if the slice is a B-slice. This is illustrated in blocks 1818 and 1810 of FIG. 18A and by syntax 1706 of FIG. 17A, which reads the mvd_l1_zero_flag if the slice is a B-slice.

Information associated with the initialization of context variables used in entropy encoding is then read according to a flag, as shown in block 1822 of FIG. 18A. Illustrative syntax for performing this operation is shown in FIG. 17A as syntax 1708. Note again that the processing shown in syntax 1708 can be made without reference (e.g. a conditional logic using) the slice type, as this operation is pertinent to all P-type slices and B-type slices, and this condition was determined in syntax 1702, and need not be reassessed.

If the slice was encoded with at least one temporal motion vector predictor, and the slice is B-type, a flag (collocated_from_l0_flag) is read which controls the reading of an index (collocated_ref_idx) that indicates which reference picture is used as a collocated picture at either 10 or 11. This is illustrated in blocks 1824-1826 of FIG. 18A and syntax 1710 illustrated in FIG. 17A.

Weighted prediction is applied depending on whether the slice is a B-type slice or a P-type slice, as shown in blocks 1828-1830. In the illustrated example, the predicted weight table is read if the slice is a P-type slice and a weighted prediction flag is set or if the slice is a B-type slice and a weighted biprediction flag is set. This is illustrated in syntax 1712.

A maximum number of merged temporal motion vector predictor candidates for the slice is determined from the header, as shown in block 1834 and in slice header syntax 1714 of FIG. 17A. Note again that the processing shown in syntax 1714 can be made without reference (e.g. a conditional logic using) the slice type, as this operation is pertinent to all P-type slices and B-type slices, and this condition was determined in syntax 1701.

An initial value for calculating quantization factor for the slice (slice_qp_delta) is then read according to the slice header. This is illustrated in block 1836 of FIG. 18B and syntax 1716 of FIG. 17A.

Figure 18B:
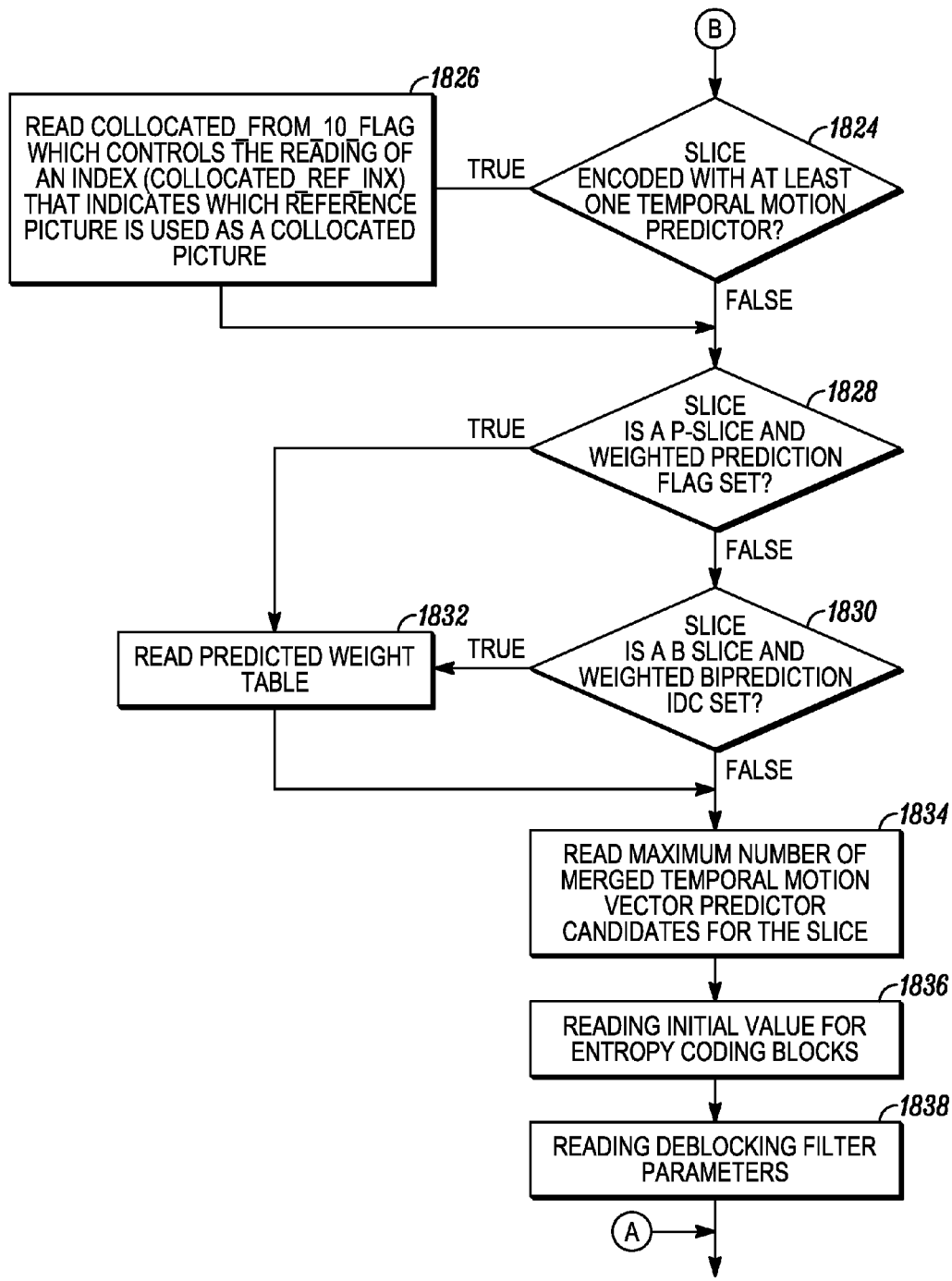
Figure 21:
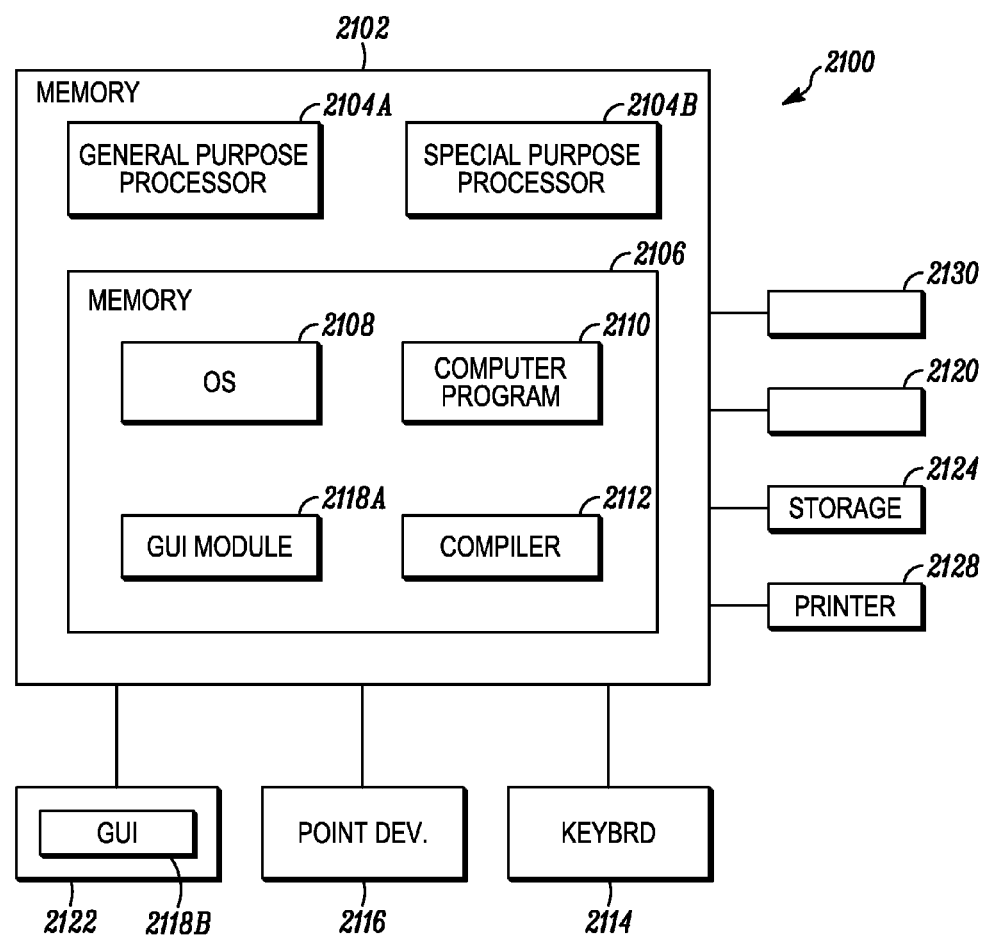
FIG. 21 illustrates an exemplary processing system that could be used to implement the embodiments of the invention.

Deblocking filter parameters are read, as shown in block 1838 of FIG. 18B and in syntax 1718 of FIG. 17A. The deblocking syntax 1718 is unchanged from the baseline deblocking filter control syntax illustrated in FIG. 16B Likewise the adaptive loop filter processing shown in syntax 1720 and 1722 remains unchanged from the adaptive loop filter processing shown in syntax 1640-1642 of FIG. 16C. Finally, the tile processing syntax 1724 is also unchanged to the tile processing syntax 1644 of FIG. 16C.

Second Solution: Appending Slice Quantization Parameter Initial Values and Deblocking Parameters after Grouped P and B Type Logic Conditions This solution is similar to the first solution, in that relative syntax and function calls performed under the condition that the slice type is P or B are grouped together and placed after the slice_qp_delta and deblocking-related syntax.

FIGS. 19A and 19B are diagrams illustrating the modified slice header syntax of the second solution. Referring first to FIG. 19A, the slice_qp_data syntax 1716 and deblocking-related syntax 1718 is performed before the conditional statement syntax testing whether the slice is an inter-predicted slice. In syntax 1701, this is performed by determining if the slice is a P-type or a B-type (P||B), but this may also be implemented by determining if the slice s not I-type. Syntax 1702-1712 (described above) is the performed if the slice is a P-type slice or a B-type slice, and syntax 1720-1724 (but not conditioned on the text performed by syntax 1701 to determine if the slice is a P-slice or a B-slice).

Third Solution

Grouping P and B Type Logic Conditions into Two Groups

This solution is also similar to the first and second solutions, in that the relative syntax and function calls performed under the condition that the slice type is P or B are grouped together. In this solution, the position of slice_qp_delta and deblocking related syntax in the current CD remain unchanged, but the relative syntax and function calls under the condition of slice type equal to P/B before and after slice_qp_delta and deblocking related syntax are grouped together separately under separate conditional statements.

FIGS. 20A and 20B are diagrams illustrating the modified slice header syntax of the third solution. Referring first to FIG. 19A, a conditional statement 1701 tests whether the slice is an inter-predicted slice. Again, this can be performed by a single conditional logic statement if (slice_type==P||slice_type==B) or if (slice_type !I). If the slice is an inter-predicted slice, syntax elements 1702-1708 are performed, including syntax 1702 related to the enabling temporal motion vector predictors, syntax 1704 related to reference picture override logic, syntax 1705 related to reference picture list modification, syntax 1706 related to motion vector difference coding syntax structure (mvd_l1_zero_flag) and syntax 1708 related to the cabac logic.

For all slice types (including I-type), the slice header ten reads the slice_qp_delta parameter and performs the deblocking operations shown in syntax 1716 and 1718.

Turning to FIG. 20B, another conditional statement to determine if the slice type is inter-predicted slice. Again, this may be accomplished with a single conditional statement testing for P||B as shown in syntax 2002 or a single conditional statement testing for !I (not I). If the conditional statement 2002 tests positive, the temporal motion vector predictor logic syntax and weighted prediction table-related syntax 1712 is performed, and the maximum number of merge candidates is read, as shown in syntax 1710, 1712, and 1714, respectively. The remaining syntax header logic 1720-1724 is performed as before.

Hardware Environment

FIG. 20 illustrates an exemplary processing system 2000 that could be used to implement the embodiments of the invention. The computer 2002 comprises a processor 2004 and a memory, such as random access memory (RAM) 2006. The computer 2002 is operatively coupled to a display 2022, which presents images such as windows to the user on a graphical user interface 2018B. The computer 2002 may be coupled to other devices, such as a keyboard 2014, a mouse device 2016, a printer, etc. Of course, those skilled in the art will recognize that any combination of the above components, or any number of different components, peripherals, and other devices, may be used with the computer 2002.

Generally, the computer 2002 operates under control of an operating system 2008 stored in the memory 2006, and interfaces with the user to accept inputs and commands and to present results through a graphical user interface (GUI)

module 2018A. Although the GUI module 2018A is depicted as a separate module, the instructions performing the GUI functions can be resident or distributed in the operating system 2008, the computer program 2010, or implemented with special purpose memory and processors. The computer 2002 also implements a compiler 2012 which allows an application program 2010 written in a programming language such as COBOL, C++, FORTRAN, or other language to be translated into processor 2004 readable code. After completion, the application 2010 accesses and manipulates data stored in the memory 2006 of the computer 2002 using the relationships and logic that was generated using the compiler 2012. The computer 2002 also optionally comprises an external communication device such as a modem, satellite link, Ethernet card, or other device for communicating with other computers.

In one embodiment, instructions implementing the operating system 2008, the computer program 2010, and the compiler 2012 are tangibly embodied in a computer-readable medium, e.g., data storage device 2020, which could include one or more fixed or removable data storage devices, such as a zip drive, floppy disc drive 2024, hard drive, CD-ROM drive, tape drive, etc. Further, the operating system 2008 and the computer program 2010 are comprised of instructions which, when read and executed by the computer 2002, causes the computer 2002 to perform the steps necessary to implement and/or use the invention. Computer program 2010 and/or operating instructions may also be tangibly embodied in memory 2006 and/or data communications devices 2030, thereby making a computer program product or article of manufacture. As such, the terms "article of manufacture," "program storage device" and "computer program product" as used herein are intended to encompass a computer program accessible from any computer readable device or media.

The processing system 2000 may also be embodied in a desktop, laptop, tablet, notebook computer, personal data assistant (PDA), cellphone, smartphone, or any device with suitable processing and memory capability. Further, the processing system 2000 may utilize special purpose hardware to perform some or all of the foregoing functionality. For example the encoding and decoding processes described above may be performed by a special purpose processor and associated memory.

Those skilled in the art will recognize many modifications may be made to this configuration without departing from the scope of the present disclosure. For example, those skilled in the art will recognize that any combination of the above components, or any number of different components, peripherals, and other devices, may be used. For example, particular functions described herein can be performed by hardware modules, or a processor executing instructions stored in the form of software or firmware. Further, the functionality described herein can be combined in single modules or expanded to be performed in multiple modules.

CONCLUSION

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. In a processing device for decoding a sequence comprising a plurality of pictures, each of the plurality of pictures partitionable into one or more slices, each of the one or more slices to be processed at least in part according to a slice header, a method of generating the slice header describing slice parameters, comprising:
   encoding slice type data for a slice of the one or more slices in the header, the slice type data indicating the slice type, wherein:
     the slice is a B-type slice if the at least one coding unit of the slice is coded using motion compensation according to up to two motion vectors associated with at least one reference picture;
     the slice is a P-type slice if at least one coding unit of the slice is coded using motion compensation according to no more than one motion vector; and
     the slice is an I-type slice if no coding units of the slice are coded using motion compensation prediction;
   the slice is an inter-predicted slice if it is a P-type slice or a B-type slice;
   encoding slice header logic for decoding an initial value for coding blocks within the slice;
   encoding slice header logic for decoding deblocking filter parameters according to the slice header;
   encoding slice header logic for determining, if a slice of the one or more slices is an inter-predicted slice according to slice type data read from the slice header;
   encoding slice header logic for performing, with further slice type testing performed only to identify the inter-predicted slice as either a P-type slice or a B-type slice and with no further slice testing performed to identify the inter-predicted slice as a slice type other than a P-type slice or a B-type slice, steps comprising steps (a)-(k) if the slice determined to be an inter-picture predicted slice:
   (a) determining if a sequence temporal motion vector predictor flag indicates that the sequence in which the picture is disposed may be encoded using the at least one temporal motion vector predictor;
   (b) if the sequence temporal motion vector predictor flag indicates that the sequence in which the picture is disposed may be encoded using the at least one temporal motion vector predictor, reading a/slice picture temporal motion vector predictor enable flag indicating that the picture in which the slice is disposed is encoded using at least one temporal motion vector predictor;
   (c) reading a reference picture override flag indicating whether data describing a maximum index of at least one list of reference pictures having the at least one reference picture is included in the slice header;
   (d) if the read reference picture override flag indicates that the data describing the maximum index of the at least one list of reference pictures having the at least one reference picture is present, reading the data;
   (e) reading reference picture list modification information only if the at least one reference picture is not implicitly defined;
   (f) reading information indicating a structure of motion vector differences used in the motion compensation prediction if the slice is a B-slice;
   (g) reading information defining initialization of context variables for entropy coding of the slice only if the information defining initialization of the context variables is present in the slice header;

(h) determining if the slice is encoded using at least one temporal motion predictor according to the read picture temporal motion vector predictor enable flag;

(i) only if the slice encoded using at least one temporal motion predictor, reading information describing at least one reference picture of the slice associated with the at least one temporal motion predictor slice/picture at least in part according to whether the slice is a P-type slice or a B-type slice;

(j) applying a weighted prediction according to whether the slice is a B-type slice or a P-type slice; and (k) determining, from the slice header, a maximum number of merged temporal motion vector predictor candidates for the slice.

2. The method of claim 1, wherein the slice header logic for determining if a slice of the one or more slices is an inter-predicted slice according to slice type data comprises:
testing, in one conditional operation, if the slice is an not an I-type slice according to the slice type data read from the slice header.

3. The method of claim 2, wherein the slice header logic for determining, if a slice of the one or more slices is an inter-predicted slice according to slice type data comprises:
testing in one conditional statement, if the slice is a P-type slice or a B-type slice according to the slice type data read from the slice header.

4. The method of claim 1, wherein the picture is associated with a picture parameter set, and wherein:
the reading the reference picture list modification information only if the reference pictures are not implicitly defined comprises:
determining, from a lists modification flag of the picture parameter set, if any of the reference pictures are not implicitly defined;
if any of the reference pictures are not implicitly defined, reading the reference picture list modification information;
the reading information indicating a structure of motion vector differences used in the motion compensation prediction if the slice is a B-slice comprises:
determining, from the slice type data of the slice header if the slice is a B-type slice;
only if the slice is a B-type slice, reading a flag indicating a structure of the motion vector differences used in the motion compensation prediction;
the reading information associated with initialization of context variables for entropy coding of the slice comprises:
determining, from a context variable initialization present flag of the picture parameter set, whether a context variable initialization flag specifying a method for determining an initialization table used to initialize context variables for entropy coding is to be read from the slice header;
only if the context variable initialization present flag is set, reading the context variable initialization flag from the slice header;
the reading information describing the at least one reference picture of the slice associated with the at least one temporal motion predictor at least in part according to whether the slice is a P-type slice or a B-type slice comprises:
determining, from slice type data of the slice header, if the slice is a B-type slice;
if the slice is a B-type slice, reading a flag identifying a list having the reference picture containing a collocated partition for the slice;
reading the reference index of the reference picture associated with the at least one temporal motion predictor at least in part according to the flag identifying the list;
the applying a weighted prediction according to whether the slice is a B-type slice or a P-type slice comprises
determining, from weighted prediction flag of the picture parameter set, if the at least one temporal motion predictor is modified by a weighted prediction; and
only if the temporal motion predictor is modified by a weighted prediction, applying the weighted prediction according to whether the slice is a B-type slice or a P-type slice.

5. A processing device for decoding a sequence comprising a plurality of pictures, each of the plurality of pictures partitionable into one or more slices, each of the one or more slices to be processed at least in part according to a slice header, the processing device having a processor for performing instructions stored in a communicatively coupled memory for generating the slice header describing slice parameters, the instructions comprising instructions for:

(a) decoding an initial value for coding blocks within the slice;

(b) decoding deblocking filter parameters according to the slice header;

(c) determining, if a slice of the one or more slices is an inter-predicted slice according to slice type data, wherein:
the slice is a B-type slice if the at least one coding unit of the slice is coded using motion compensation according to up to two motion vectors associated with at least one reference picture;
the slice is a P-type slice if at least one coding unit of the slice is coded using motion compensation according to no more than one motion vector associated with the at least one reference picture;
the slice is an I-type slice if no coding units of the slice are coded using motion compensation; and
the slice is an inter-predicted slice only if it is a P-type slice or a B-type slice;

(d) if the slice is determined to be an inter-picture predicted slice, performing, with further slice type testing performed only to identify the inter-predicted slice as either a P-type slice or a B-type slice and with no further slice testing performed to identify the inter-predicted slice as a slice type other than a P-type slice or a B-type slice:

(1) determining if a sequence temporal motion vector predictor flag indicates that the sequence in which the picture is disposed is encoded using the at least one temporal motion vector predictor;

(2) if the sequence temporal motion vector predictor flag indicates that the sequence in which the picture is disposed may be encoded using the at least one temporal motion vector predictor, reading a slice/picture temporal motion vector predictor enable flag indicating that the picture in which the slice is disposed is encoded using at least one temporal motion vector predictor;

(3) reading a reference picture override flag indicating whether data describing a maximum index of at least one list of reference pictures having the at least one reference picture is included in the slice header;
(4) if the read reference picture override flag indicates that the data describing the maximum index of the at least one list of reference pictures having the at least one reference picture is present, reading the data;
(5) reading reference picture list modification information only if the at least one reference picture is not implicitly defined;
(6) reading information indicating a structure of motion vector differences used in the motion compensation prediction if the slice is a B-slice;
(7) reading information defining initialization of context variables for entropy coding of the slice only if the information defining initialization of the context variables is present in the slice header;
(8) determining if the slice is encoded using at least one temporal motion predictor according to the read slice/picture temporal motion vector predictor enable flag;
(9) only if the slice encoded using at least one temporal motion predictor, reading information describing at least one reference picture of the slice associated with the at least one temporal motion predictor at least in part according to whether the slice is a P-type slice or a B-type slice;
(10) applying a weighted prediction according to whether the slice is a B-type slice or a P-type slice; and
(11) determining, from the slice header, a maximum number of merged temporal motion vector predictor candidates for the slice.

6. The device of claim 5, wherein determining, if a slice of the one or more slices is an inter-predicted slice according to slice type data comprises:
testing, in one conditional operation, if the slice is an not an I-type slice according to the slice type data read from the slice header.

7. The device of claim 5, wherein determining, if a slice of the one or more slices is an inter-predicted slice according to slice type data comprises:
testing in one conditional statement, if the slice is a P-type slice or a B-type slice according to the slice type data read from the slice header.

8. The device of claim 5, wherein the picture is associated with a picture parameter set, and wherein:
the reading the reference picture list modification information only if the reference pictures are not implicitly defined comprises:
determining, from a lists modification flag of the picture parameter set, if any of the reference pictures are not implicitly defined; and
if any of the reference pictures are not implicitly defined, reading the reference picture list modification information;
the reading information indicating a structure of motion vector differences used in the motion compensation prediction if the slice is a B-slice comprises:
determining, from the slice type data of the slice header if the slice is a B-type slice; and
only if the slice is a B-type slice, reading a flag indicating a structure of the motion vector differences used in the motion compensation prediction;
the reading information associated with initialization of context variables for entropy coding of the slice comprises:
determining, from a context variable initialization present flag of the picture parameter set, whether a context variable initialization flag specifying a method for determining an initialization table used to initialize context variables for entropy coding is to be read from the slice header; and
only if the context variable initialization present flag is set, reading the context variable initialization flag from the slice header;
the reading information describing the at least one reference picture of the slice associated with the at least one temporal motion predictor at least in part according to whether the slice is a P-type slice or a B-type slice comprises:
determining, from slice type data of the slice header, if the slice is a B-type slice;
if the slice is a B-type slice, reading a flag identifying a list having the reference picture containing a collocated partition for the slice; and
reading the reference index of the reference picture associated with the at least one temporal motion predictor at least in part according to the flag identifying the list;
the applying a weighted prediction according to whether the slice is a B-type slice or a P-type slice comprises:
determining, from weighted prediction flag of the picture parameter set, if the at least one temporal motion predictor is modified by a weighted prediction; and
only if the temporal motion predictor is modified by a weighted prediction, applying the weighted prediction according to whether the slice is a B-type slice or a P-type slice.

* * * * *